(12) United States Patent
Matsumoto

(10) Patent No.: US 12,321,900 B2
(45) Date of Patent: Jun. 3, 2025

(54) MAINTENANCE MANAGEMENT SYSTEM, MAINTENANCE MANAGEMENT METHOD, AND COMPUTER READABLE MEDIUM

(71) Applicant: Mitsubishi Electric Corporation, Tokyo (JP)

(72) Inventor: Takashi Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 262 days.

(21) Appl. No.: 18/002,705

(22) PCT Filed: Sep. 5, 2020

(86) PCT No.: PCT/JP2020/033700
§ 371 (c)(1),
(2) Date: Dec. 21, 2022

(87) PCT Pub. No.: WO2022/049746
PCT Pub. Date: Mar. 10, 2022

(65) Prior Publication Data
US 2023/0245076 A1     Aug. 3, 2023

(51) Int. Cl.
G06Q 30/00         (2023.01)
G06Q 10/20         (2023.01)

(52) U.S. Cl.
CPC .................................... G06Q 10/20 (2013.01)

(58) Field of Classification Search
None
See application file for complete search history.

(56) References Cited

U.S. PATENT DOCUMENTS

| 7,222,111 B1* | 5/2007 | Budike, Jr. ....... H02J 13/00001 705/412 |
| 2010/0004758 A1* | 1/2010 | Masui .................. G05B 19/058 700/79 |

(Continued)

FOREIGN PATENT DOCUMENTS

| CN | 108061357 A | 5/2018 |
| JP | 2002-174445 A | 6/2002 |

(Continued)

OTHER PUBLICATIONS

Universal IoT Vending Machine Management Platform Author: Tegeltija, Srdjan et al., . . . Publication info: 2020 19th International Symposium INFOTEH-JAHORINA, INFOTEH 2020—Proceedings Institute of Electrical and Electronics Engineers Inc. (Mar. 2020) (Year: 2020).*

(Continued)

Primary Examiner — Matthew T Sittner
(74) Attorney, Agent, or Firm — Posz Law Group, PLC

(57) ABSTRACT

A maintenance management system is provided with a management device that manages an air conditioner operated by an operation device and provided with a maintenance support device that supports maintenance of the air conditioner. A candidate display unit of the management device selects based on lifestyle information that shows a lifestyle of a user, a type to be presented to the user from among a plurality of types of a consumable item used in the air conditioner. The candidate display unit displays the selected type on the operation device as purchase candidates. A selection reception unit of the management device receives a candidate selected by the user from the purchase candidates, as a purchase consumable item. A purchase support unit of the management device lets the user purchase (Continued)

the purchase consumable item through an electronic commerce environment.

12 Claims, 21 Drawing Sheets

(56) References Cited

U.S. PATENT DOCUMENTS

| | | | | |
|---|---|---|---|---|
| 2010/0292860 | A1* | 11/2010 | Komiya | F24F 11/64 |
| | | | | 700/295 |
| 2011/0054927 | A1* | 3/2011 | Renna | G07F 11/004 |
| | | | | 705/28 |
| 2011/0071722 | A1* | 3/2011 | Uto | B61D 27/0018 |
| | | | | 62/157 |
| 2011/0258073 | A1* | 10/2011 | Lifson | H04M 7/0024 |
| | | | | 705/26.7 |
| 2013/0106613 | A1* | 5/2013 | Lee | H04L 67/125 |
| | | | | 340/691.3 |
| 2014/0058569 | A1* | 2/2014 | Kuroiwa | F24F 11/30 |
| | | | | 700/276 |
| 2014/0156086 | A1* | 6/2014 | Kuroiwa | F24F 11/64 |
| | | | | 700/276 |
| 2015/0302449 | A1* | 10/2015 | Akbarpour | G06Q 30/0643 |
| | | | | 705/14.23 |
| 2017/0292726 | A1* | 10/2017 | Sato | F24F 11/72 |
| 2017/0344703 | A1* | 11/2017 | Ansari | H04L 67/53 |
| 2018/0096312 | A1* | 4/2018 | Lechtenberg | G06Q 10/20 |
| 2018/0101880 | A1* | 4/2018 | Colantoni | G06Q 30/0601 |
| 2020/0303058 | A1* | 9/2020 | Deno | G06Q 40/08 |
| 2020/0410778 | A1* | 12/2020 | Aiba | G06Q 10/087 |
| 2021/0071401 | A1* | 3/2021 | Shen | G06F 18/214 |
| 2022/0082282 | A1 | 3/2022 | Ishizaki | |

FOREIGN PATENT DOCUMENTS

| | | |
|---|---|---|
| JP | 2003-329295 A | 11/2003 |
| JP | 2004-102802 A | 4/2004 |
| JP | 2005-030693 A | 2/2005 |
| JP | 2009-093292 A | 4/2009 |
| JP | 2009-127875 A | 6/2009 |
| JP | 2009-139010 A | 6/2009 |
| JP | 2010-054181 A | 3/2010 |
| JP | 2011-226694 A | 11/2011 |
| JP | 2013-190861 A | 9/2013 |
| JP | 2015-161425 A | 9/2015 |
| JP | 2019-027681 A | 2/2019 |
| JP | 2020-123249 A | 8/2020 |
| KR | 10-2012-0076440 A | 7/2012 |

OTHER PUBLICATIONS

Leveraging Machine Learning and Big Data for Smart Buildings: A Comprehensive Survey Author: Qolomany, Basheer; Al-Fuqaha, Ala; Gupta, Ajay; Benhaddou, Driss; Alwajidi, Safaa; Qadir, Junaid; Fong, Alvis C Publication info: arXiv.org Ithaca: Cornell University Library, arXiv.org. (May 19, 2019) (Year: 2019).*

Maintaining Mission Critical Systems in a 24/7 Environment Author: Pokrop, Frank Publication info: Quality Progress 47.4: 60. American Society for Quality. (Apr. 2014) (Year: 2014).*

Office Action dated Jun. 27, 2024 issued in corresponding Chinese Patent Application No. 202080103611.2 (and English machine translation).

International Search Report of the International Searching Authority mailed Dec. 8, 2020 in corresponding International application No. PCT/JP2020/033700 (and English translation).

Office Action dated Dec. 10, 2024 issued in corresponding Chinese Patent Application No. 202080103611.2 (and English machine translation).

Office Action dated Mar. 19, 2025 issued in corresponding Chinese Patent Application No. 202080103611.2 (and English machine translation).

* cited by examiner

Fig. 10

50: LIFESTYLE INFORMATION

| CONSUMABLE ITEM USAGE INFORMATION 51 | | CLEANING SERVICE INFORMATION 53 | | | | LIFESTYLE 52 | | | |
|---|---|---|---|---|---|---|---|---|---|
| TYPE OF PURCHASE CONSUMABLE ITEM | PURCHASE DATE | USAGE PERIOD | DETAILS OF CLEANING SERVICE | EXECUTION DATE | DEGREE OF DIRTINESS | PERSON IN CHARGE OF CLEANING | AGE GENDER | FAMILY STRUCTURE | LIFE PATTERN | PREFERENCE | ... |

Fig. 11

DISPLAY EXAMPLE OF PURCHASE CANDIDATES 41

| TYPE | CLEANING FILTER | | |
|---|---|---|---|
| | DUST COLLECTION FILTER | DEODORIZATION FILTER | ALLERGEN SUBSTANCE REMOVAL FILTER |
| PICTURE | | | |
| PICTURE | COLLECT PM2.5 | DEODORIZATION, ALLERGEN SUBSTANCE REMOVAL, ANTIBACTERIAL | ALLERGEN SUBSTANCE REMOVAL, ANTIBACTERIAL |
| MARKET PRICE (YEN) | 2000 | 2000 | 1000 |

RECOMMENDED FILTER FOR YOU!

Fig. 13
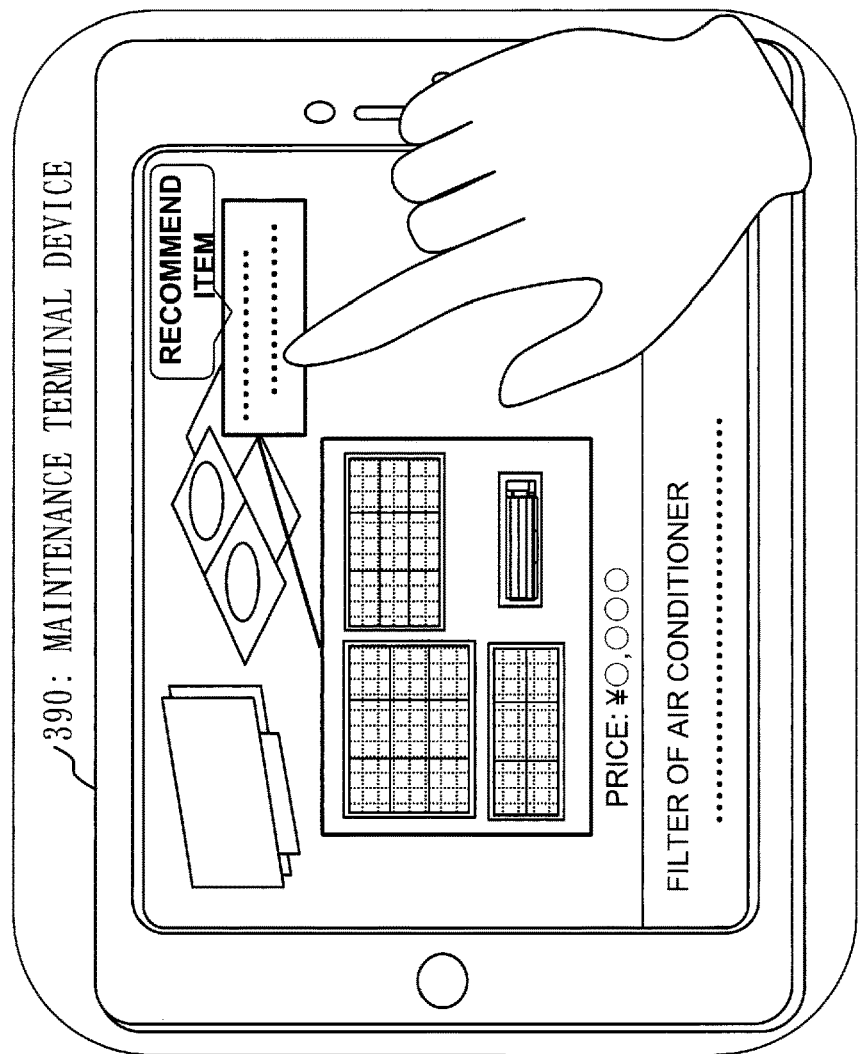
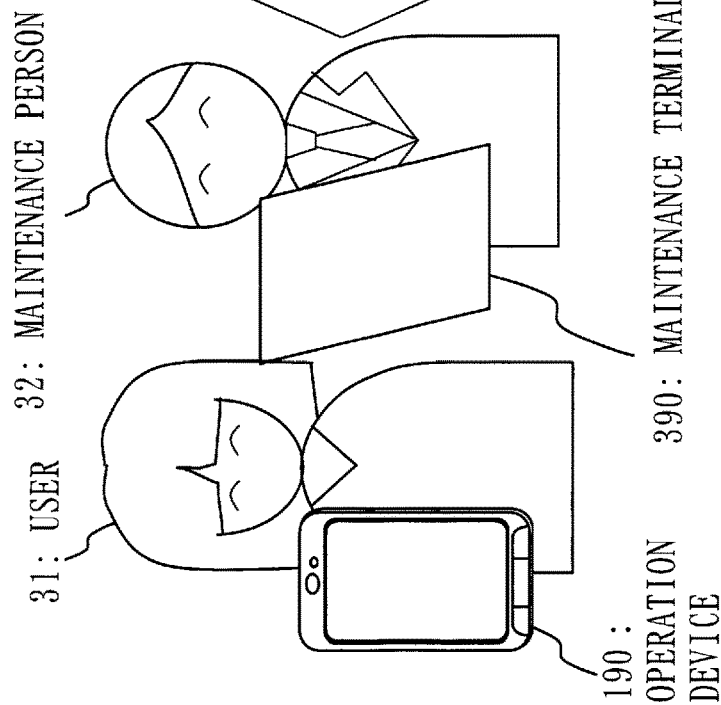

Fig. 17
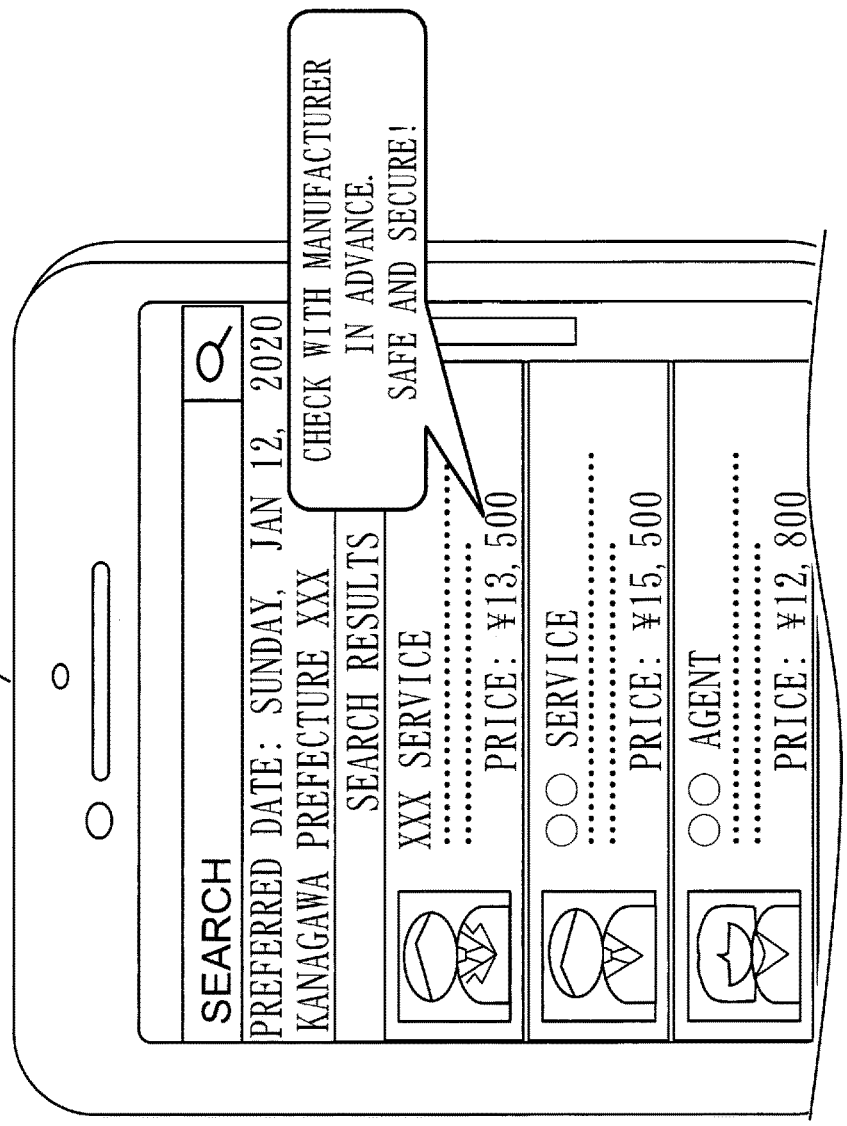
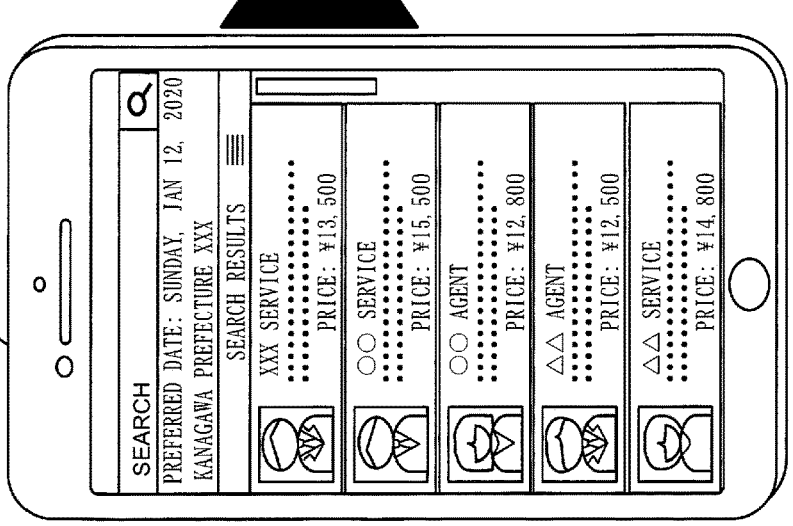

MAINTENANCE MANAGEMENT SYSTEM, MAINTENANCE MANAGEMENT METHOD, AND COMPUTER READABLE MEDIUM

CROSS REFERENCE TO RELATED APPLICATION

This application is a U.S. National Stage Application of International Application No. PCT/JP2020/033700, filed on Sep. 5, 2020, the contents of which are incorporated herein by reference.

Technical Field

The present disclosure relates to a maintenance management system, a maintenance management method, and a maintenance management program.

Background

In recent years, a demand for an air conditioner that controls optimal air conditioning depending on a lifestyle of a user has been increasing. Further, the best service depending on the lifestyle of the user is desired to be given also in a cleaning service on the air conditioner.

It is preferable to realize the cleaning service on the air conditioner in cooperation with a cleaning company, a manufacturer of the air conditioner and the user of the air conditioner.

Patent Literature 1 discloses that a worker who cleans an air conditioner registers to a server of a cleaning company, an annual operation time for the air conditioner cleaned at a user's house and a degree of dirtiness of a device.

Patent Literature

Patent Literature 1: JP 2010-054181 A

In cleaning companies, each company manages the quality standards of a cleaning work under its own standards. Further, due to the lack of product knowledge, a worker of a cleaning company is often unable to respond to inquiries from a user, including an inquiry on how to use an air conditioner at a working site.

Further, in manufacturers, each company has installed a function such as an "automatic filter cleaning mechanism" function, an "antibacterial device" function, or a "mold sterilization control" function, focusing on the appeal of cleanliness, but not all users have been able to enjoy the value of a product. Further, a manufacturer lacks recognition for an actual situation of a user, such as a situation where an elderly person cannot clean an air conditioner while standing on a step stool or a situation where there is no accumulated data on a degree of cleanliness (degree of dirtiness) under an actual environment of the user.

Further, when the user selects a cleaning company, there are a few criteria for determination and there is little information to make a decision.

At present, there is no platform for an air conditioner total service that connects the cleaning company, the manufacturer, and the user with each other. Therefore, there is a problem in that each of them still faces the above-mentioned problems and its system is inefficient due to the lack of optimization.

SUMMARY

An object of a maintenance management device according to the present disclosure is to realize a platform for an air conditioner total service that connects a cleaning company, a manufacturer, and a user with each other.

A maintenance management system according to the present disclosure that includes: a management device to manage an air conditioner operated by an operation device; and a maintenance support device to support maintenance of the air conditioner, and that manages the maintenance of the air conditioner, the management device including:
a candidate display unit to select based on lifestyle information that shows a lifestyle of a user who uses the air conditioner, a type to be presented to the user, from among a plurality of types of a consumable item used in the air conditioner, and to display the selected type on the operation device as purchase candidates;
a selection reception unit to receive a candidate selected by the user from among the purchase candidates, as a purchase consumable item; and
a purchase support unit to let the user purchase the purchase consumable item through an electronic commerce environment.

Depending on a maintenance management system according to the present disclosure, it is possible for a user to easily get the most suitable consumable item.

BRIEF DESCRIPTION OF DRAWINGS

FIG. 10 is a diagram illustrating an example of lifestyle information according to Embodiment 1.

FIG. 11 is a display example of purchase candidates for a consumable item according to Embodiment 1.

FIG. 13 is a diagram illustrating an example of an advice instruction 43 at a time of a maintenance work by a maintenance person in Embodiment 1.

FIG. 17 is a diagram illustrating an example of a selection screen for a cleaning company according to Embodiment 2.

DETAILED DESCRIPTION

Figure 1:
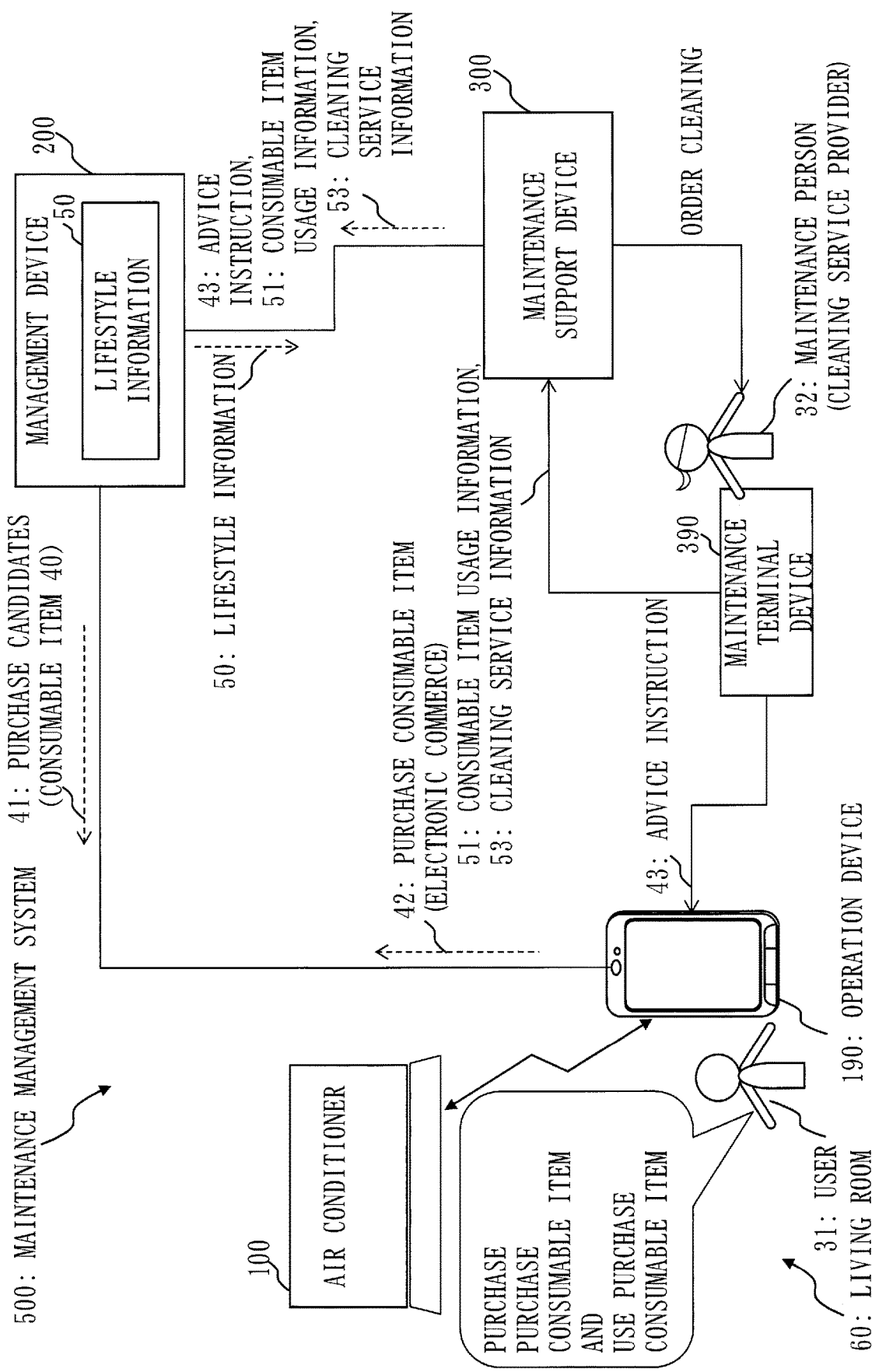
FIG. 1 is a configuration example of a maintenance management system according to Embodiment 1.

Embodiments of the present disclosure will be described hereinafter with reference to the drawings. Throughout the drawings, the same or corresponding parts are denoted by the same reference signs. In the description of the embodiments, description of the same or corresponding parts will be suitably omitted or simplified. Further, in the drawings hereinafter, the relative sizes of each component may be different from actual ones. Further, in the description of the embodiments, directions or positions such as up, down, left, right, front, rear, top side, and back side may be indicated. These terms are used only for convenience of description, and are not intended to limit the placement, direction, and orientation of components such as devices, equipment, or parts.

Embodiment 1

Configurations of the present embodiment will be described with reference to FIG. 1 to FIG. 6.

Description of Configurations

FIG. 1 is a diagram illustrating a configuration example of a maintenance management system 500 according to the present embodiment.

The maintenance management system 500 manages maintenance of an air conditioner 100. The maintenance management system 500 is a system that realizes a platform for an air conditioner total service that connects an operation device 190 (a user 31), a management device 200 (a manufacturer), and a maintenance support device 300 (a maintenance support provider) with each other. The maintenance management system 500 is provided with the management device 200 that manages the air conditioner 100 operated by the operation device 190 and the maintenance support device 300 that supports the maintenance of the air conditioner 100.

The air conditioner 100 is installed in a living room 60 wherein the user 31 live. The air conditioner 100 is a refrigeration cycle device that realizes functions such as cooling and heating.

The air conditioner 100 communicates with the operation device 190 via a wireless Local Area Network (LAN) such as Wi-Fi (registered trademark) or short-distance wireless communication such as Bluetooth (registered trademark). Further, the air conditioner 100 communicates with the management device 200 via a network such as the Internet.

The management device 200 may be a cloud server installed in a cloud system. The management device 200 is specifically a server managed by a manufacturer of the air conditioner 100.

The maintenance support device 300 is specifically a server managed by a company that provides a maintenance service, such as a cleaning company. The maintenance support device 300 is connected via a network, to a maintenance terminal device 390 carried by a maintenance person 32 who is a worker providing a maintenance service such as cleaning.

The maintenance terminal device 390 is specifically a smartphone terminal, a tablet terminal, or a computer terminal such as a Personal Computer (PC).

The operation device 190 is a device used by the user 31 to operate the air conditioner 100. The operation device 190 is connected to the management device 200 via a network. Alternatively, the operation device 190 may be connected to the maintenance support device 300 via the network. Further, the operation device 190 and the maintenance terminal device 390 can communicate with each other via a network or short-distance wireless communication.

The operation device 190 is specifically a smartphone terminal, a tablet termina, or a computer terminal such as a PC.

The air conditioner 100 is provided with a sensor unit and a control program which are not illustrated. The control program is a program used for controlling an operational capacity of the air conditioner 100. The control program is specifically a program that controls an air conditioner with the operational capacity of 2.2 kW.

The sensor unit senses a situation of the living room 60. The situation of the living room 60 is specifically a situation of the living room 60 such as a room shape, an indoor heat load such as high or low insulation, a furniture layout, a living area of a user, or a flow line of the user. These situations of the living room 60 are set in lifestyle information 50 in real time as living room information. The sensor unit is specifically an infrared sensor that detects an indoor absolute temperature. Further, the sensor unit may include a device such as a camera that photographs the inside of a room. Furthermore, the sensor unit senses an airflow reachable limit range in the living room 60 with a sensor capable of sensing an airflow reachable degree of the air conditioner 100 in real time. Then, a current airflow reachable limit range in the living room 60 is set in the living room information.

The air conditioner 100 is provided with the sensor unit that detects a temperature of the living room 60 while rotating. For example, the sensor unit generates one thermal image by rotating 360 degrees in the left and right directions. Then, indoor states such as an occupancy position of the user and an indoor temperature in the living room 60, are detected by taking a difference between a thermal image being generated by a rotation of the sensor unit and a thermal image having been generated by a previous rotation.

Configurations of the air conditioner 100 will be described with reference to FIG. 2 and FIG. 3.

Figure 2:
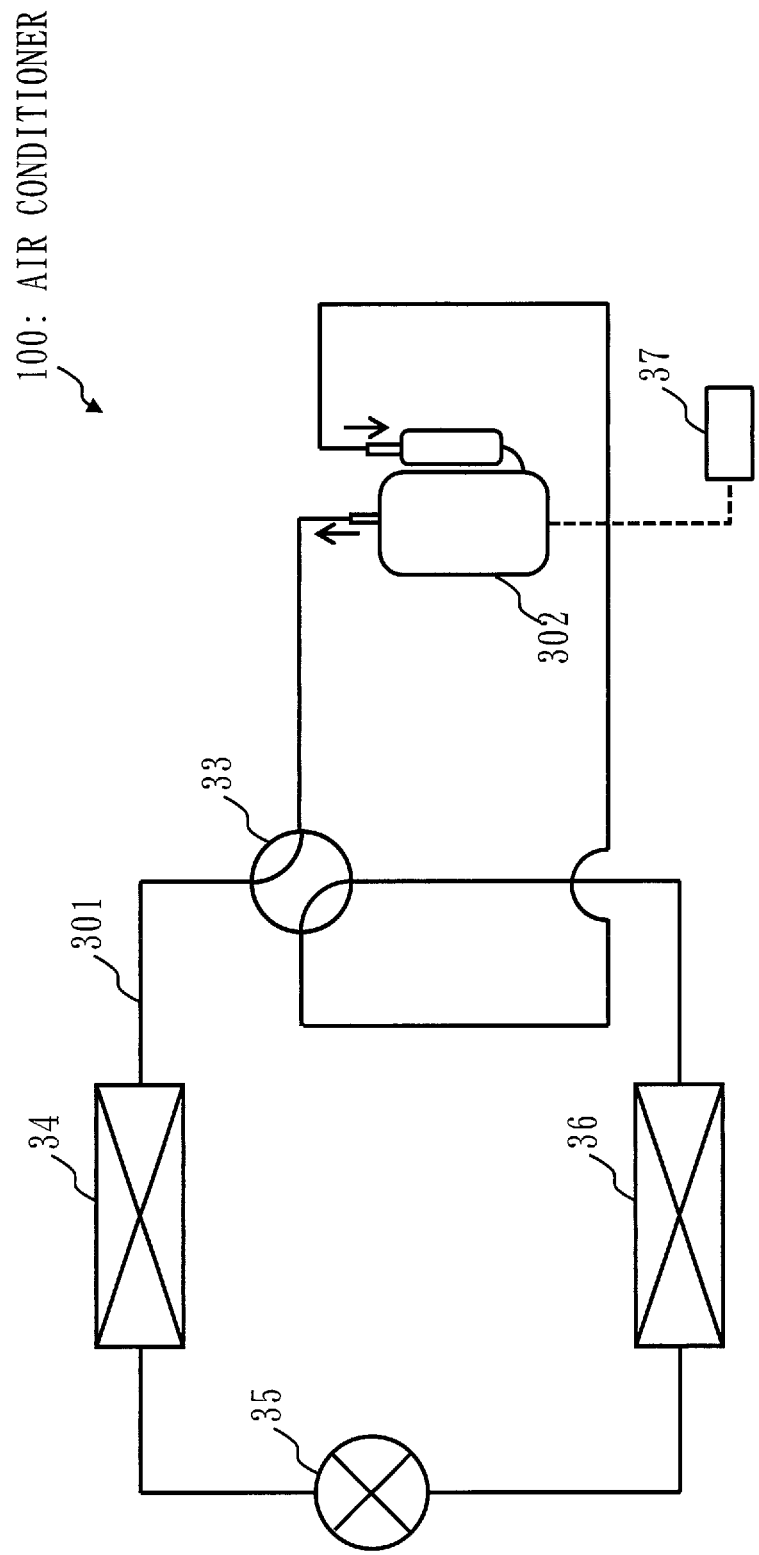
FIG. 2 is a refrigerant circuit at a time of cooling operation of an air conditioner according to Embodiment 1.

FIG. 2 illustrates a refrigerant circuit 301 at a time of cooling operation. FIG. 3 illustrates the refrigerant circuit 301 at a time of heating operation.

The air conditioner 100 is provided with the refrigerant circuit 301 in which refrigerant circulates. The air conditioner 100 is further provided with a compressor 302, a four-way valve 33, a first heat exchanger 34 which is an outdoor heat exchanger, an expansion mechanism 35 which is an expansion valve, and a second heat exchanger 36 which is an indoor heat exchanger. The compressor 302, the four-way valve 33, the first heat exchanger 34, the expansion mechanism 35, and the second heat exchanger 36 are connected to the refrigerant circuit 301.

The compressor 302 compresses the refrigerant. The four-way valve 33 switches the direction of a refrigerant flow between the time of the cooling operation and the time of the heating operation. The first heat exchanger 34 operates as a condenser at the time of the cooling operation and radiates heat of the refrigerant compressed by the compressor 302. That is, the first heat exchanger 34 exchanges heat with using the refrigerant compressed by the compressor 302. The first heat exchanger 34 operates as an evaporator at the time of the heating operation and heats the refrigerant by exchanging heat between outdoor air and the refrigerant expanded by the expansion mechanism 35. The expansion mechanism 35 expands the refrigerant whose heat has been radiated by the condenser. The second heat exchanger 36 operates as a condenser at the time of the heating operation and radiates the heat of the refrigerant compressed by the compressor 302. That is, the second heat exchanger 36 exchanges heat with using the refrigerant compressed by the compressor 302. The second heat exchanger 36 operates as an evaporator at the time of the cooling operation and heats the refrigerant by exchanging heat between indoor air and the refrigerant expanded by the expansion mechanism 35.

The air conditioner 100 is further provided with a controller 37 that controls a refrigerant cycle of the air conditioner 100. The controller 37 controls the refrigerant cycle of the air conditioner 100 by executing the control program.

Figure 3:
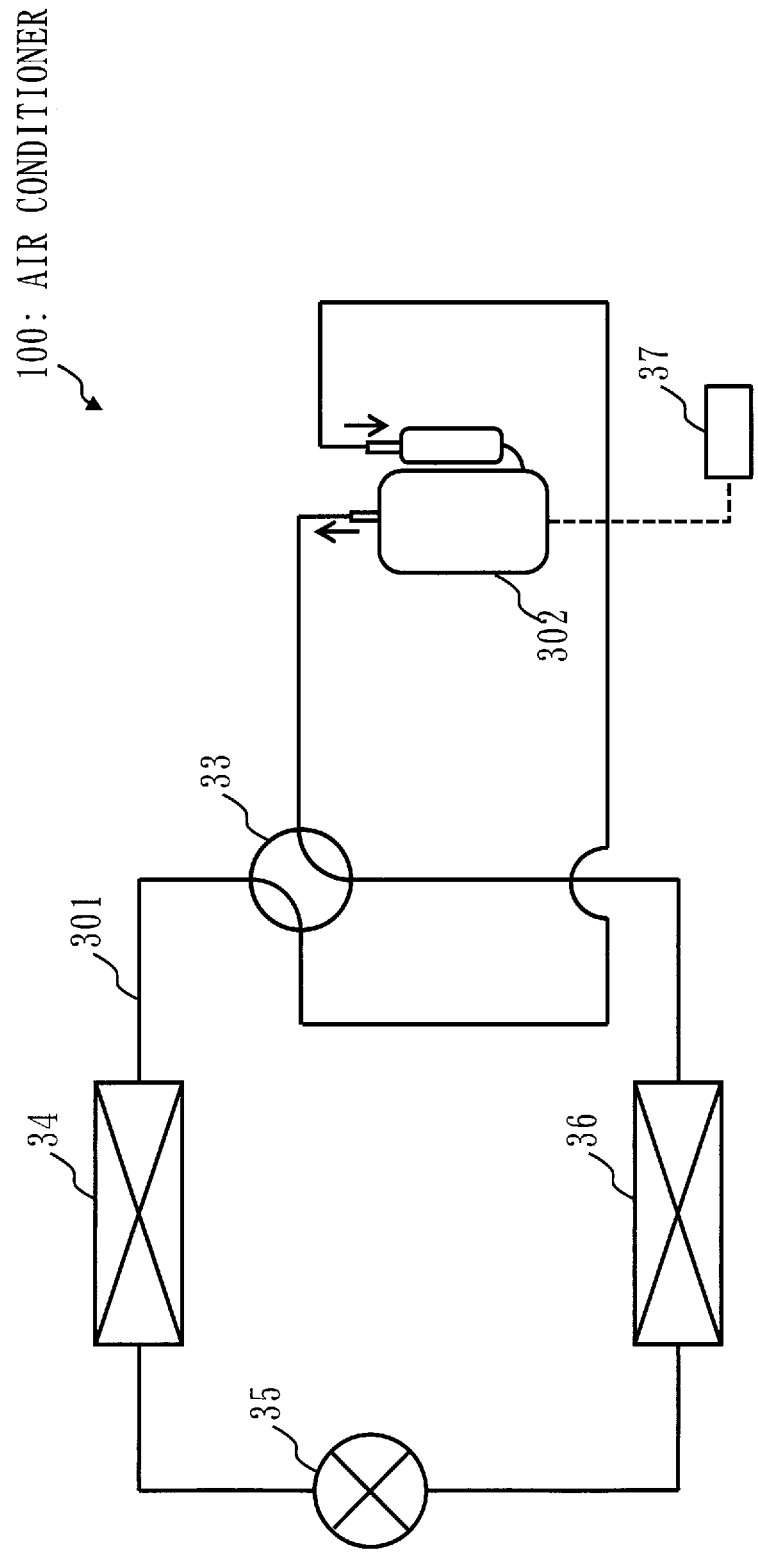
FIG. 3 is the refrigerant circuit at a time of heating operation of the air conditioner according to Embodiment 1.

Although the controller 37 is connected to only the compressor 302 in FIG. 2 and FIG. 3, the controller 37 may be connected to not only the compressor 302 but also constituent elements other than the compressor 302 connected to the refrigerant circuit 301. The controller 37 monitors and controls a state of each constituent element connected to the controller 37.

Figure 4:
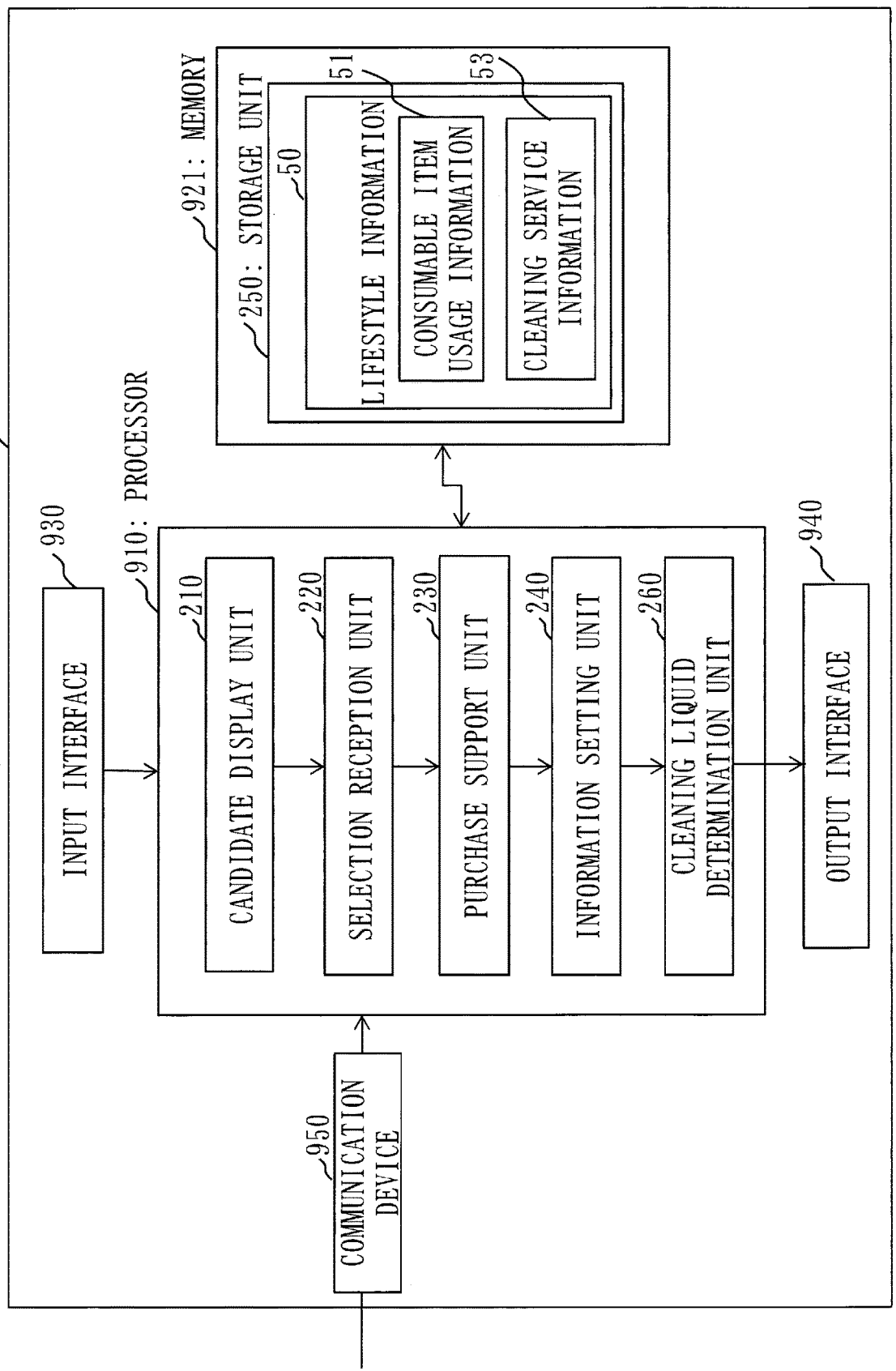
FIG. 4 is a configuration diagram of a management device according to Embodiment 1.

FIG. 4 is a diagram illustrating a configuration of the management device 200 according to the present embodiment.

The management device 200 is a computer. The management device 200 is provided with a processor 910 and also provided with other pieces of hardware such as a memory 921, an input interface 930, an output interface 940, and a communication device 950. The processor 910 is connected to the other pieces of hardware via signal lines and controls these other pieces of hardware. Further, the management device 200 is provided with an auxiliary storage device which is not illustrated.

The management device 200 is provided with a candidate display unit 210, a selection reception unit 220, a purchase support unit 230, an information setting unit 240, a cleaning liquid determination unit 260, and a storage unit 250, as functional elements.

Functions of the candidate display unit 210, the selection reception unit 220, the purchase support unit 230, the information setting unit 240, and the cleaning liquid determination unit 260 are implemented by software. The storage unit 250 is provided in the memory 921. The storage unit 250 stores the lifestyle information 50.

Figure 5:
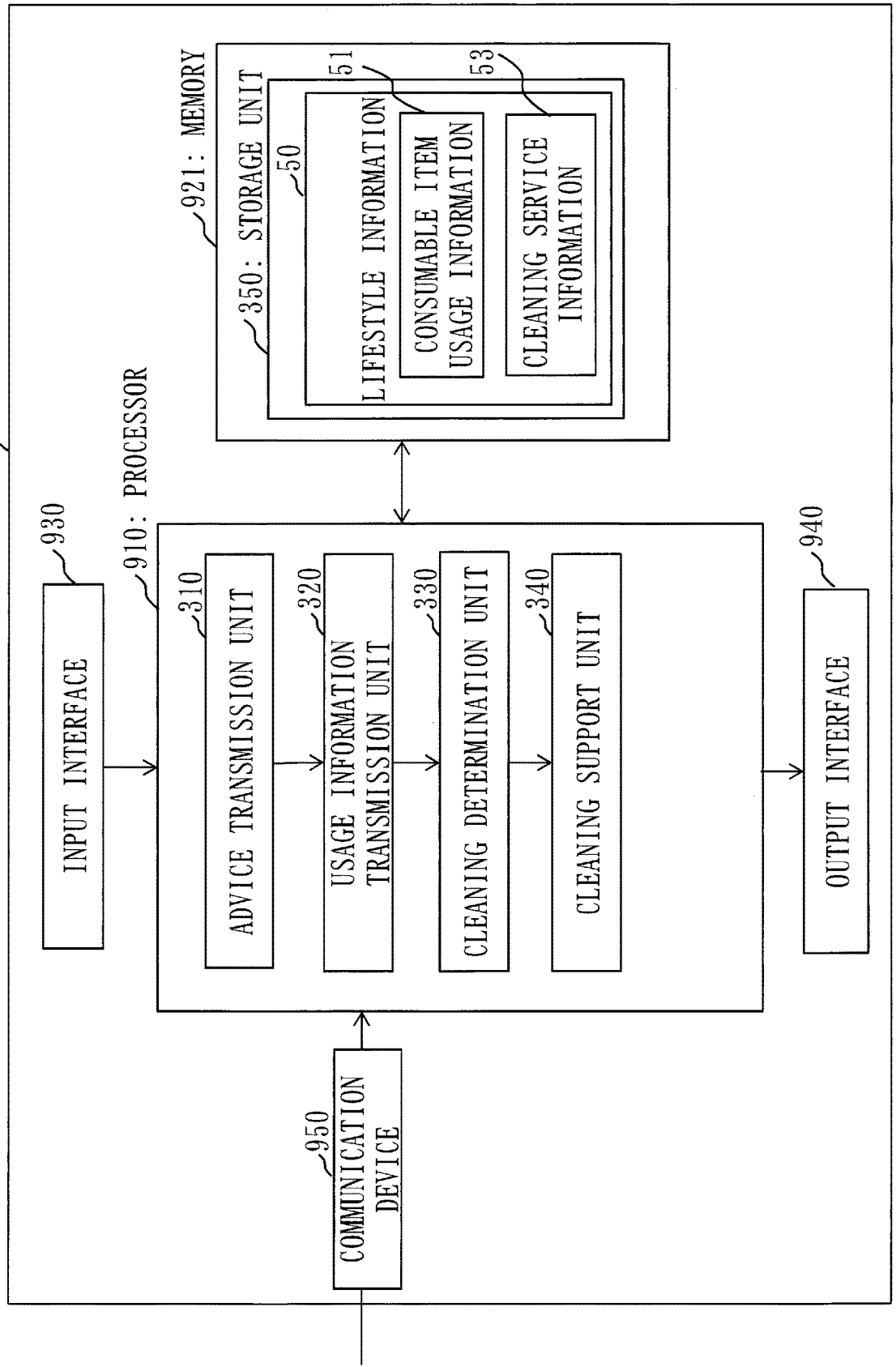
FIG. 5 is a configuration diagram of a maintenance support device according to Embodiment 1.

FIG. 5 is a diagram illustrating a configuration of the maintenance support device 300 according to the present embodiment.

The maintenance support device 300 is a computer. The maintenance support device 300 is provided with the processor 910 and also provided with other pieces of hardware such as the memory 921, the input interface 930, the output interface 940, and the communication device 950. The processor 910 is connected to the other pieces of hardware via signal lines and controls these other pieces of hardware. Further, the maintenance support device 300 is provided with the auxiliary storage device which is not illustrated.

The maintenance support device 300 is provided with an advice transmission unit 310, a usage information transmission unit 320, a cleaning determination unit 330, a cleaning support unit 340, and a storage unit 350, as functional elements.

Functions of the advice transmission unit 310, the usage information transmission unit 320, the cleaning determination unit 330, and the cleaning support unit 340 are implemented by software. The storage unit 350 is provided in the memory 921. The storage unit 350 stores the lifestyle information 50.

Figure 6:
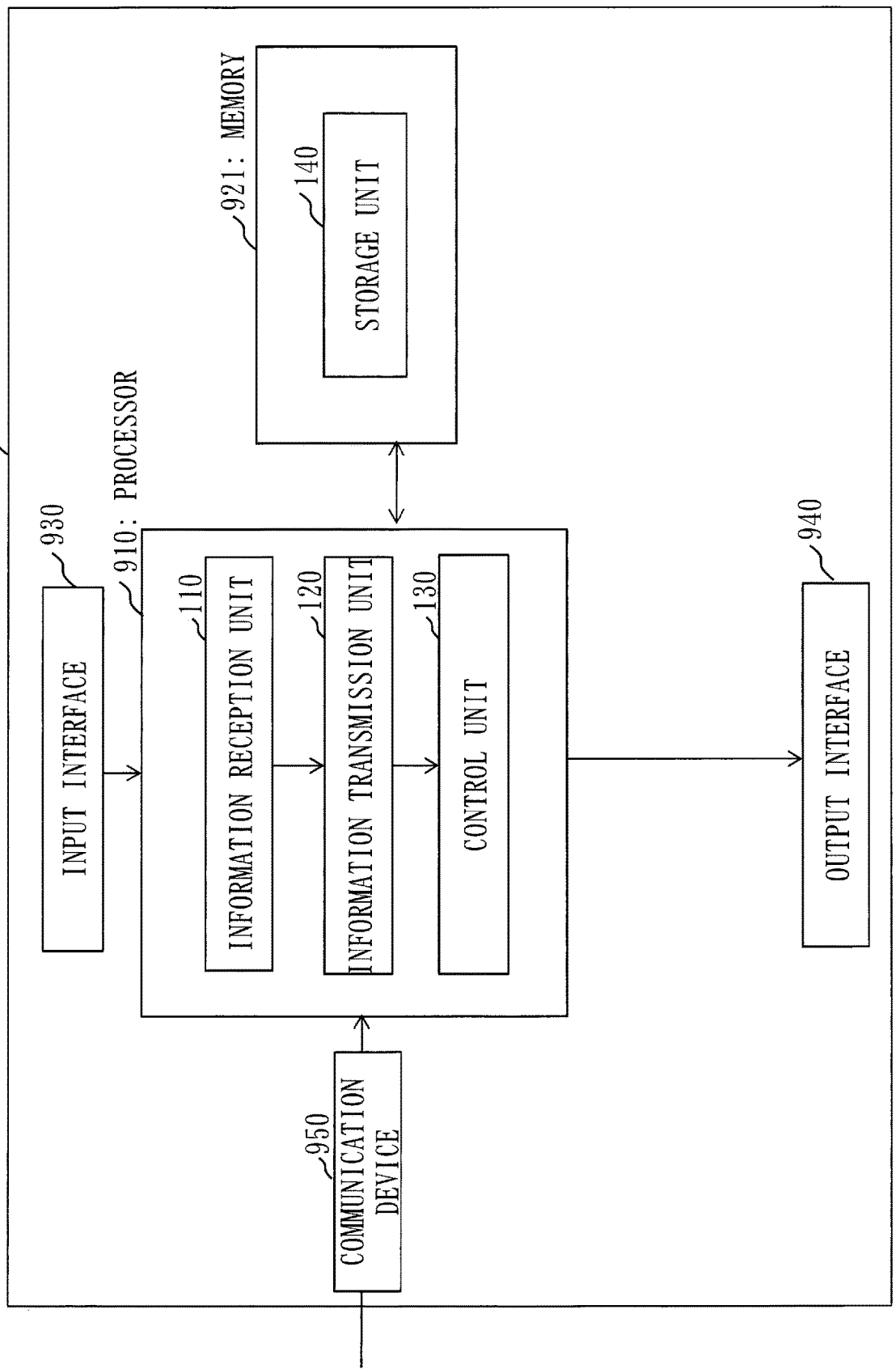
FIG. 6 is a configuration diagram of the air conditioner according to Embodiment 1.

FIG. 6 is a diagram illustrating a configuration of the air conditioner 100 according to the present embodiment.

The air conditioner 100 is provided with a computer. The air conditioner 100 is provided with the processor 910 and also provided with other pieces of hardware such as the memory 921, the input interface 930, the output interface 940, and the communication device 950. The processor 910 is connected to the other pieces of hardware via signal lines and controls these other pieces of hardware. Further, the air conditioner 100 is provided with the auxiliary storage device which is not illustrated.

The air conditioner 100 is provided with an information reception unit 110, an information transmission unit 120, a control unit 130, and a storage unit 140, as functional elements.

Functions of the information reception unit 110, the information transmission unit 120, and the control unit 130 are implemented by software. The storage unit 140 is provided in the memory 921. The storage unit 140 stores the lifestyle information 50. Further, the control unit 130 is an example of the controller 37 in FIG. 2 and FIG. 3.

Figure 7:
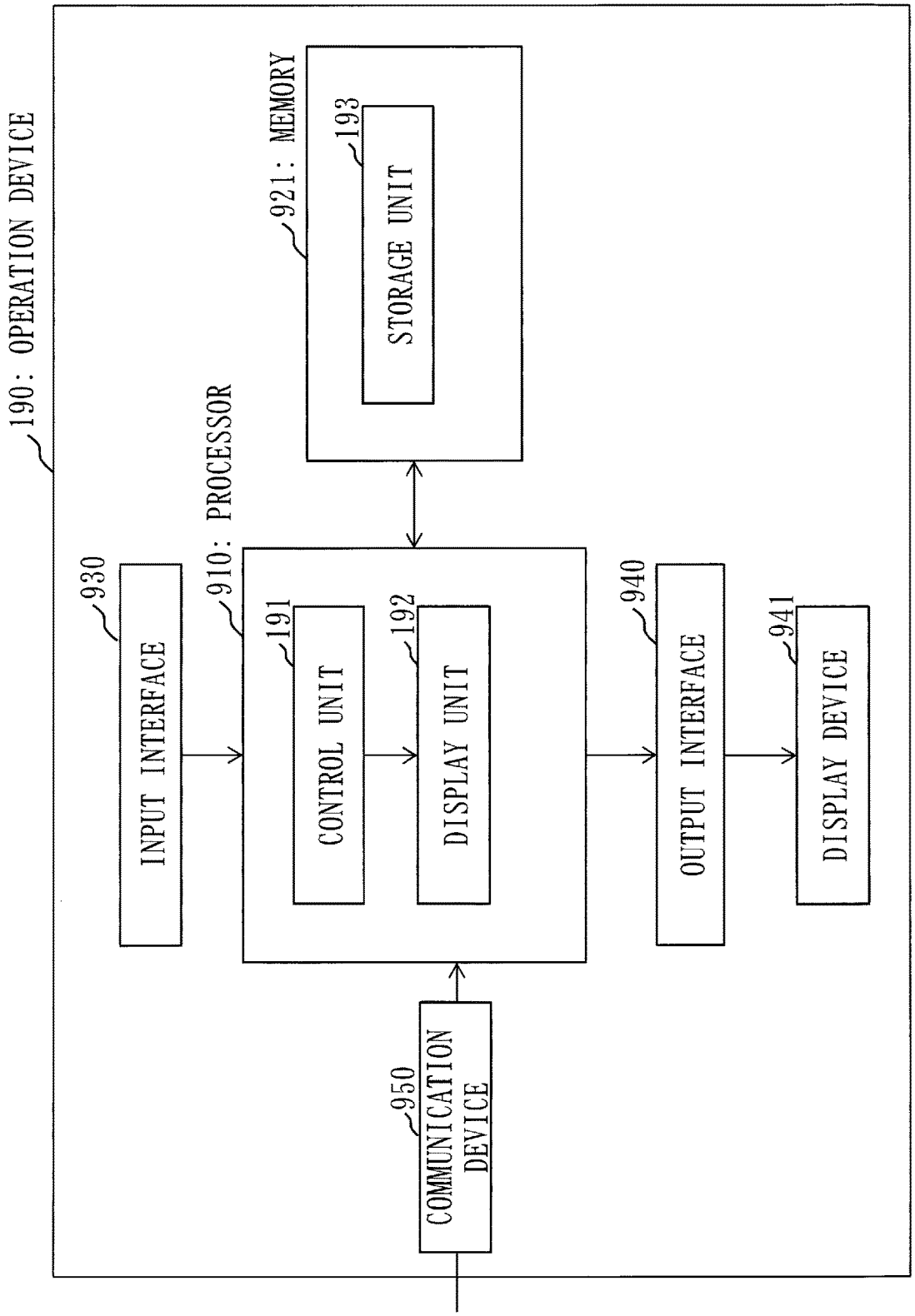
FIG. 7 is a configuration diagram of an operation device according to Embodiment 1.

FIG. 7 is a diagram illustrating a configuration of the operation device 190 according to the present embodiment.

The operation device 190 is a computer. The operation device 190 is provided with the processor 910 and also provided with other pieces of hardware such as the memory 921, the input interface 930, the output interface 940, and the communication device 950. The processor 910 is connected to the other pieces of hardware via signal lines and controls these other pieces of hardware. Further, the operation device 190 is provided with the auxiliary storage device which is not illustrated. Further, the output interface 940 is connected to a display device 941 which is a display.

The operation device 190 is provided with a control unit 191, a display unit 192, and a storage unit 193, as functional elements.

Functions of the control unit 191 and the display unit 192 are implemented by software. The storage unit 193 is provided in the memory 921.

Figure 8:
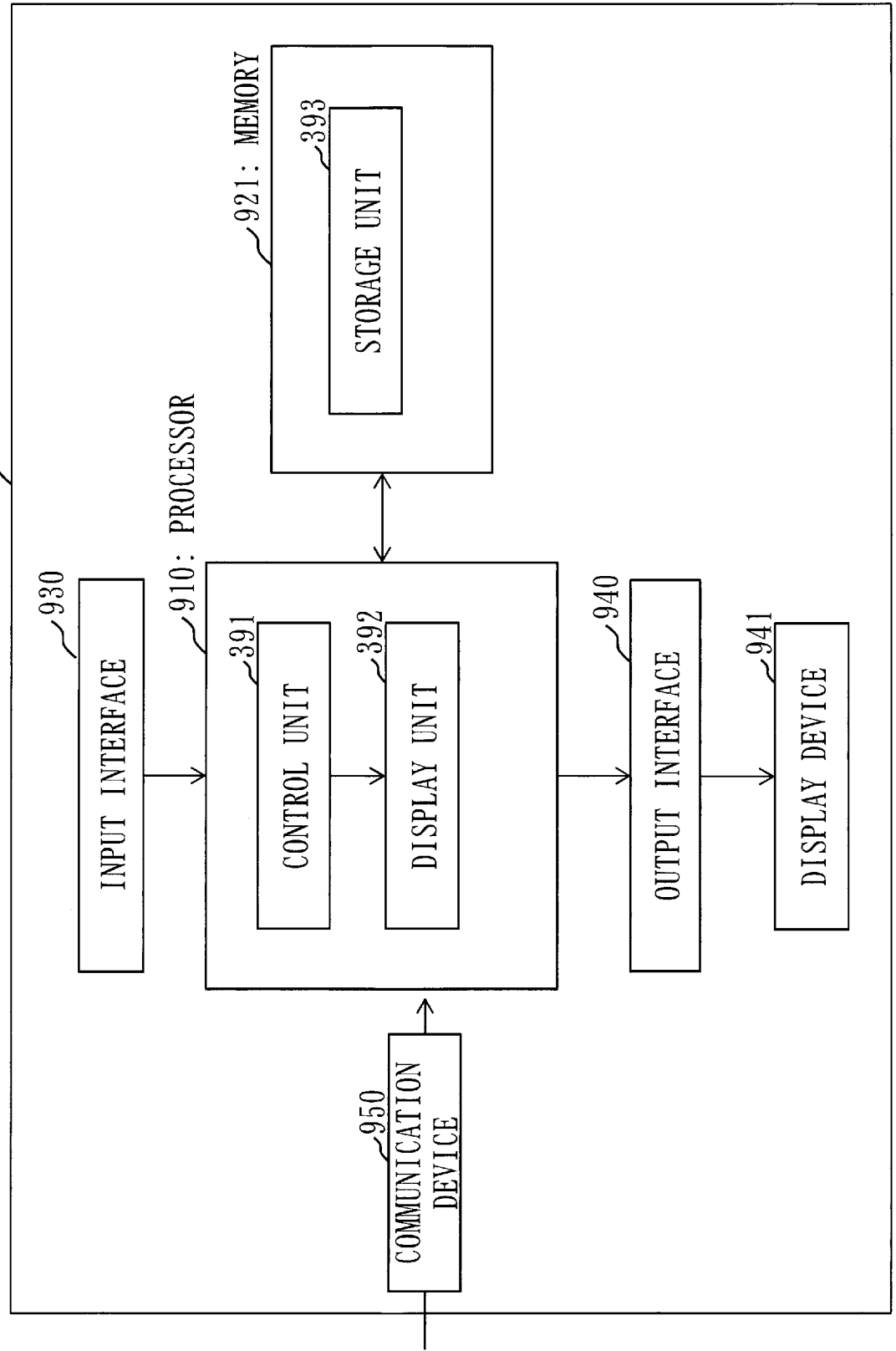
FIG. 8 is a configuration diagram of a maintenance terminal device according to Embodiment 1.

FIG. 8 is a diagram illustrating a configuration of the maintenance terminal device 390 according to the present embodiment.

The maintenance terminal device 390 is a computer. The maintenance terminal device 390 is provided with the processor 910 and also provided with other pieces of hardware such as the memory 921, the input interface 930, the output interface 940, and the communication device 950. The processor 910 is connected to the other pieces of hardware via signal lines and controls these pieces of hardware. Further, the maintenance terminal device 390 is provided with the auxiliary storage device which is not illustrated. Further, the output interface 940 is connected to the display device 941 which is a display.

The maintenance terminal device 390 is provided with a control unit 391, a display unit 392, and a storage unit 393, as functional elements.

Functions of the control unit 391 and the display unit 392 are implemented by software. The storage unit 393 is provided in the memory 921.

In the present embodiment, pieces of hardware having the same functions are denoted by the same reference signs in order to simplify description. However, each of the air conditioner 100, the management device 200, the maintenance support device 300, the operation device 190, and the maintenance terminal device 390 has its own piece of hardware.

The processor 910 is a device that executes a maintenance management program. The maintenance management program is a program that implements functions of the air conditioner 100, the management device 200, the maintenance support device 300, the operation device 190, or the maintenance terminal device 390. The functions of the air conditioner 100 are the functions of the information reception unit 110, the information transmission unit 120, and the control unit 130. The functions of the management device 200 are the functions of the candidate display unit 210, the selection reception unit 220, the purchase support unit 230, the information setting unit 240, and the cleaning liquid determination unit 260. The functions of the maintenance support device 300 are the functions of the advice transmission unit 310, the usage information transmission unit 320, the cleaning determination unit 330, and the cleaning support unit 340. The functions of the operation device 190 are the functions of the control unit 191 and the display unit 192. The function of the maintenance terminal device 390 are the functions of the control unit 391 and the display unit 392. In the below description, at least a part of the air conditioner 100, the management device 200, the maintenance support device 300, the operation device 190, and the maintenance terminal device 390 is referred to as each device in the maintenance management system 500. Further, at least a part of the functions of the air conditioner 100, the functions of the management device 200, the functions of the maintenance support device 300, the functions of the operation device 190, or the functions of the maintenance terminal device 390 is referred to as a function of each device in the maintenance management system 500.

The processor 910 is an Integrated Circuit (IC) that performs arithmetic processing. Specific examples of the processor 910 are a Central Processing Unit (CPU), a Digital Signal Processor (DSP), and a Graphics Processing Unit (GPU).

The memory 921 is a storage device that temporarily stores data. Specific examples of the memory 921 are a Static Random Access Memory (SRAM) and a Dynamic Random Access Memory (DRAM).

The auxiliary storage device is a storage device that stores data. A specific example of the auxiliary storage device is an HDD. Alternatively, the auxiliary storage device may be a portable storage medium such as an SD (registered trademark) memory card, a CF, a NAND flash, a flexible disk, an optical disc, a compact disc, a Blue-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port that is connected to an input device such as a mouse, a keyboard, or a touch panel. The input interface 930 is specifically a Universal Serial Bus (USB) terminal. The input interface 930 may be a port that is connected to a Local Area Network (LAN).

The output interface 940 is a port to which a cable of an output device such as a display is connected. The output interface 940 is specifically a USB terminal or a High Definition Multimedia Interface (HDMI, registered trademark) terminal. The display is specifically a Liquid Crystal Display (LCD).

The communication device 950 has a receiver and a transmitter. The communication device 950 is connected to a communication network such as a LAN, the Internet, or a telephone line. The communication device 950 is specifically a communication chip or a Network Interface Card (NIC).

A maintenance management system is executed in each device in the maintenance management system 500. The maintenance management system is read into the processor 910 and executed by the processor 910. The memory 921 stores not only the maintenance management system but also an Operating System (OS). The processor 910 executes the maintenance management system while executing the OS. The maintenance management system and the OS may be stored in the auxiliary storage device. The maintenance management system and the OS stored in the auxiliary storage device are loaded into the memory 921 and executed by the processor 910. A part or all of the maintenance management system may be embedded in the OS.

Each device in the maintenance management system 500 may be provided with a plurality of processors as an alternative to the processor 910. The plurality of processors shares execution of the maintenance management system. Each of the plurality of processors is, like the processor 910, a device that executes the maintenance management system.

Data, information, signal values, and variable values that are used, processed, or output by the maintenance management system are stored in the memory 921, the auxiliary storage device, or stored in a register or a cache memory in the processor 910.

"Unit" of each unit of each device in the maintenance management system 500 may be interpreted as "process", "procedure" or "step". Further, "process" as which "unit" of each unit of each device in the maintenance management system 500 is interpreted may be interpreted as "program", or "program product". Further, "process" as which "unit" of each unit of each device in the maintenance management system 500 is interpreted may be interpreted as "computer-readable storage medium storing a program" or "computer-readable recording medium recording a program"

The maintenance management system causes a computer to execute each process, each procedure, or each step, where "unit" of each of the units is interpreted as "process", "procedure", or "step". Further, a maintenance management method is a method performed by execution of the maintenance management system by each device in the maintenance management system 500.

The maintenance management system may be stored and provided in a computer-readable recording medium or storage medium. Alternatively, the maintenance management system may be provided as a program product.

Description of Operation

Figure 9:
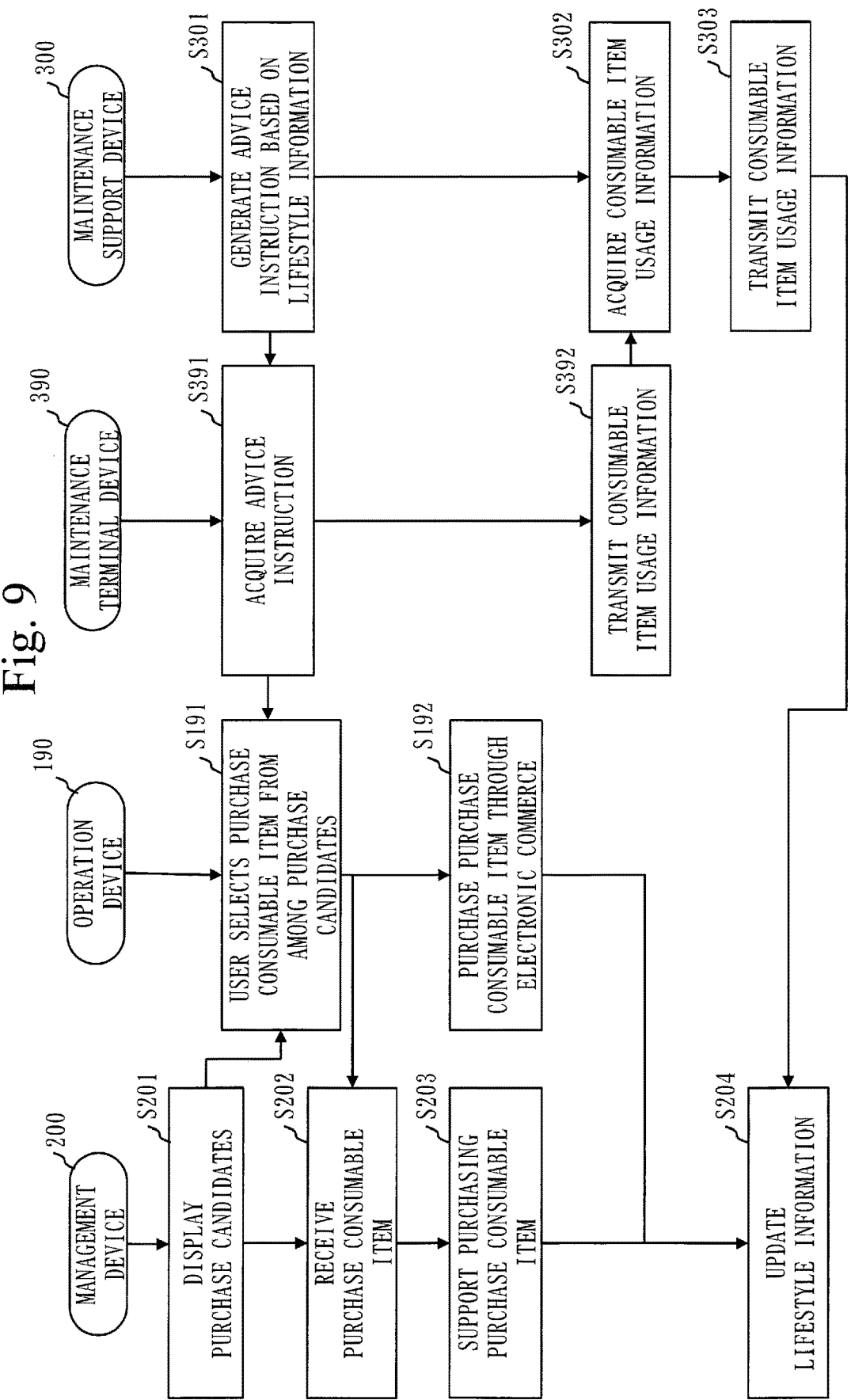
FIG. 9 is a flow diagram showing operation of a maintenance management system according to Embodiment 1.

FIG. 9 is a flow diagram showing operation of the maintenance management system 500 according to the present embodiment.

An operation procedure of the maintenance management system 500 is equivalent to the maintenance management method. Further, a program that implements the operation of the maintenance management system 500 is equivalent to the maintenance management program.

The maintenance management system 500 is provided with the management device 200 that manages the air conditioner 100 operated by the operation device 190 and provided with the maintenance support device 300 that supports the maintenance of the air conditioner 100. The maintenance management system 500 manages the maintenance of the air conditioner 100.

In step S201, based on the lifestyle information 50, the candidate display unit 210 of the management device 200 selects a type to be presented to the user 31, from among a plurality of types of a consumable item 40 used in the air conditioner 100. The candidate display unit 210 displays the selected type on the operation device 190 as purchase candidates 41.

The lifestyle information 50 is information that shows a lifestyle of the user 31 who uses the air conditioner 100.

FIG. 10 is a diagram illustrating an example of the lifestyle information 50 according to the present embodiment.

The lifestyle information 50 is information that shows the lifestyle of the user 31. Consumable item usage information 51, cleaning service information 53, and a lifestyle 52 of the user 31 are set in the lifestyle information 50. Further, other information may also be included, such as living room information relating to the living room 60 of the user 31.

For example, information such as a room shape, a heat load such as high or low insulation, a furniture layout, a living area of a user, a flow line of the user, and an airflow reachable limit range, is set in the living room information.

Various information is set in the lifestyle 52 to specify the lifestyle of the user 31. For example, it is preferable to include information on the user 31 such as gender, age, a family structure, a job type, a behavioral pattern, preference, or information on a residential house. Further, it is preferable to include vital data such as blood pressure, a heart rate, and breath of a human body. From these pieces of lifestyle 52, a lifestyle itself is recognized as an attribute of the user. As a specific example, if the user 31 is in a two-people household consisting of a man in his thirties and a woman in her thirties, it is preferable to recognize whether or not the household is a dual-income household without a child. It is preferable to recognize as the attributes, behavioral patterns such as times to wake up, to go out, to return home, to take a bath, and to sleep. A characteristic such as being sensitive to heat or cold may be recognized as the attribute. Alternatively, a preference such as comfort-oriented or energy saving-oriented may be included. Further, a preference such as a color or a shape of an object may be included.

Information relating to a consumable item purchased by the user 31 is set in the consumable item usage information 51. For example, information such as a type, a purchase date, and a usage period of a purchase consumable item 42 is set in the consumable item usage information 51.

Further, information relating to an execution history of a cleaning service on the air conditioner 100 is set in the cleaning service information 53. For example, information such as details of the cleaning service, an execution date, a degree of dirtiness, and a company and a person in charge of cleaning is set in the cleaning service information 53.

FIG. 11 is a diagram illustrating a display example of the purchase candidates 41 of the consumable item 40 according to the present embodiment.

For example, the consumable item 40 is a filter used in the air conditioner 100.

As illustrated in FIG. 11, a plurality of types of the filter includes, for example, a dust collection filter, a deodorization filter, and an allergen substance removal filter.

In step S301 and step S391, the advice transmission unit 310 of the maintenance support device 300 transmits to the operation device 190, an advice instruction 43 input by the maintenance person 32. The advice transmission unit 310 transmits to the operation device 190, the advice instruction 43 input by the maintenance person 32 via the maintenance terminal device 390 used by the maintenance person 32 who operates the maintenance of the air conditioner 100.

The candidate display unit 210 acquires the advice instruction 43 transmitted by the advice transmission unit 310. When the candidate display unit 210 acquires the advice instruction 43 for narrowing down the purchase candidates 41, the purchase candidates 41 further narrowed down by following the advice instruction 43 is displayed on the operation device 190 (step S201).

As illustrated in FIG. 11, the purchase candidates 41 for the consumable item 40 is displayed on a display of the operation device 190.

For example, the candidate display unit 210 may highlight a type to be recommended to the user 31, the type having been extracted based on the advice instruction 43 from among the purchase candidates 41. In the example of FIG. 11, the text "recommended filter for you!" is highlighted. Alternatively, the candidate display unit 210 may extract and highlight the type to be recommended to the user 31 based on the lifestyle information 50 even when there is no advice instruction 43 from the maintenance support device 300 or the maintenance terminal device 390.

In step S202, the selection reception unit 220 receives a candidate selected by the user 31 from among the purchase candidates 41, as the purchase consumable item 42. Specifically, the selection reception unit 220 receives as the purchase consumable item 42, a type of the consumable item 40 desired to be purchased, that has been input by the user 31 into the operation device 190.

In step S203, the purchase support unit 230 lets the user 31 purchase the purchase consumable item 42 through an electronic commerce environment. The electronic commerce environment is a form of a commerce known as Electronic Commerce (EC).

In step S192, the user 31 purchases the purchase consumable item 42 through the electronic commerce environment with using the operation device 190.

In step S392, the control unit 391 of the maintenance terminal device 390 acquires the consumable item usage information 51 from the maintenance person 32 who maintains the air conditioner 100 at a residence of the user 31.

The consumable item usage information 51 is information that shows a usage status of the air conditioner 100 by the user 31 at a time when the purchase consumable item 42 is used in the air conditioner 100. For example, information such as a degree of dirtiness of a filter, a request from the user 31, or a preference of the user 31 is transmitted to the maintenance support device 300 as the consumable item usage information 51.

In step S302, the usage information transmission unit 320 of the maintenance support device 300 acquires the consumable item usage information 51 that shows the usage status of the air conditioner by the user at the time when the purchase consumable item 42 is used in the air conditioner 100. Then, the usage information transmission unit 320 transmits the consumable item usage information 51 to the management device 200.

In step S204, the information setting unit 240 of the management device 200 sets the consumable item usage information 51 in the lifestyle information 50, a purchase history of the purchase consumable item 42 by the user 31. Further, the information setting unit 240 sets in the lifestyle information 50, the consumable item usage information 51 transmitted by the usage information transmission unit 320 of the maintenance support device 300. In this way, the information setting unit 240 updates the lifestyle information 50.

Figure 12:
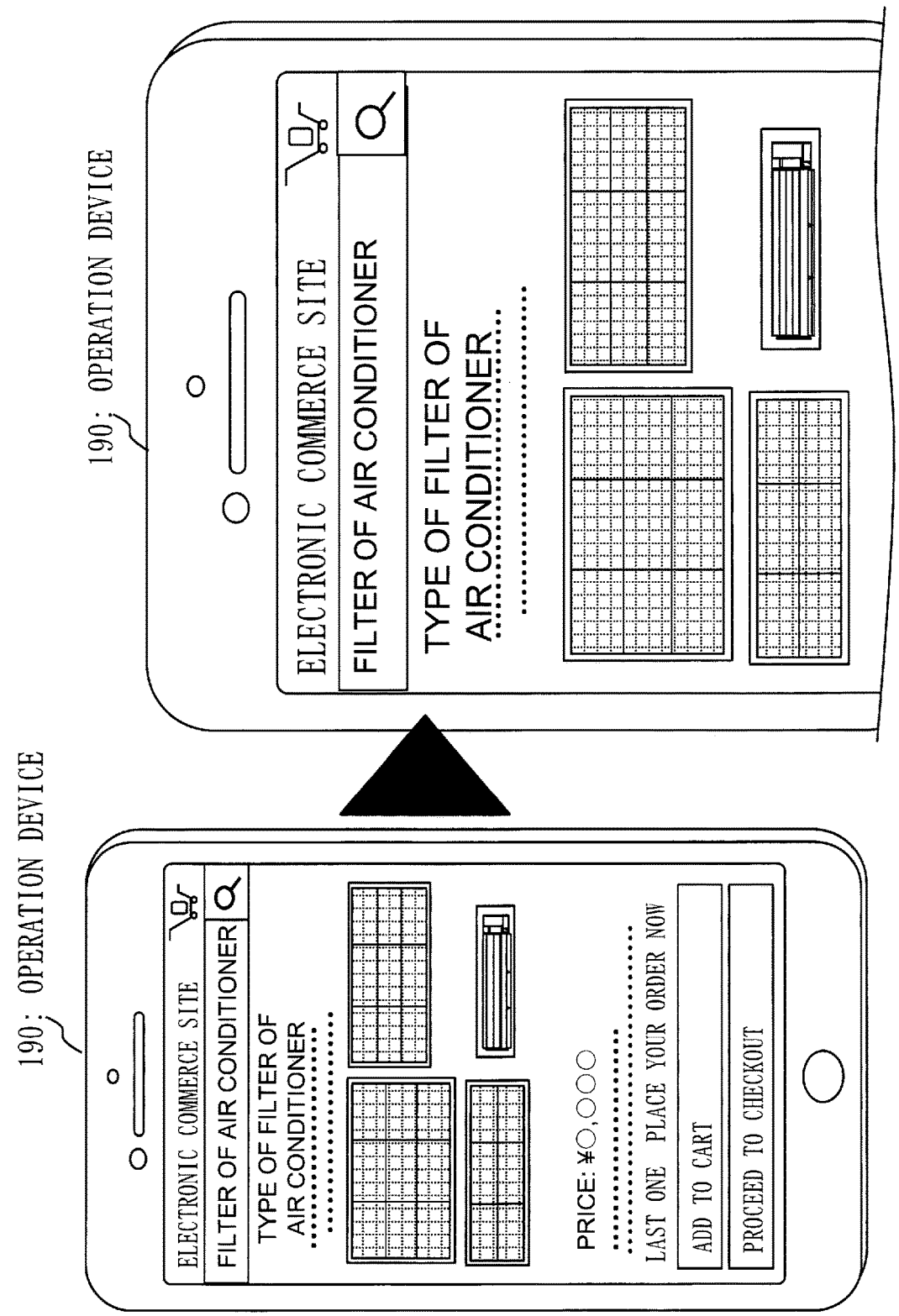
FIG. 12 is a display example of the operation device at a time when a user purchases a consumable item in Embodiment 1.

FIG. 12 is a diagram illustrating a display example of the operation device 190 at a time when the user 31 purchases the consumable item 40 in the present embodiment.

Based on the consumable item usage information 51 in the lifestyle information 50, the management device 200 announces to the user 31, a replacement timing depending on the usage status of the user 31 by transmitting a direct message. Alternatively, when the user 31 purchases the air conditioner 100, the manufacturer requests the user 31 to register for a maintenance application or a maintenance site that supports the maintenance of the air conditioner 100. The management device 200 transmits the above direct message via the maintenance application or the maintenance site.

For example, when the candidate display unit 210 receives a request from the user 31 to purchase a filter of the air conditioner 100, filters in the purchase candidates 41 are displayed via an electronic commerce site. Then, the selection reception unit 220 receives a selection of the user 31 via the electronic commerce site. Further, the purchase support unit 230 supports the user 31 to purchase the filter through the electronic commerce site.

FIG. 13 is a diagram illustrating an example of the advice instruction 43 at a time of a maintenance work by the maintenance person 32 in the present embodiment.

The maintenance person 32 performs the maintenance work on the air conditioner 100 of the user 31. At this time, there is a case where the maintenance person 32 receives from the user 31, various consultations relating to the air conditioner 100. At this time, the maintenance person 32 can transmit to the operation device 190 of the user 31, the advice instruction 43 generated by the maintenance support device 300. Alternatively, the maintenance person 32 can show to the user 31, the advice instruction 43 displayed on the maintenance terminal device 390.

For example, if the user 31 consults the maintenance person 32 that he/she does not know which filter is suitable for the air conditioner 100 in his/her house, the maintenance person 32 shows to the user 31, the advice instruction 43 displayed on the maintenance terminal device 390. Then, the maintenance person 32 may assist the user 31 in the process of purchasing the filter. Further, the maintenance person 32 can make a suggestion depending on the advice instruction 43 displayed on the maintenance terminal device 390, such as "The air conditioner is located near the kitchen in your house. This filter for oily smoke is more energy-efficient".

Figure 14:
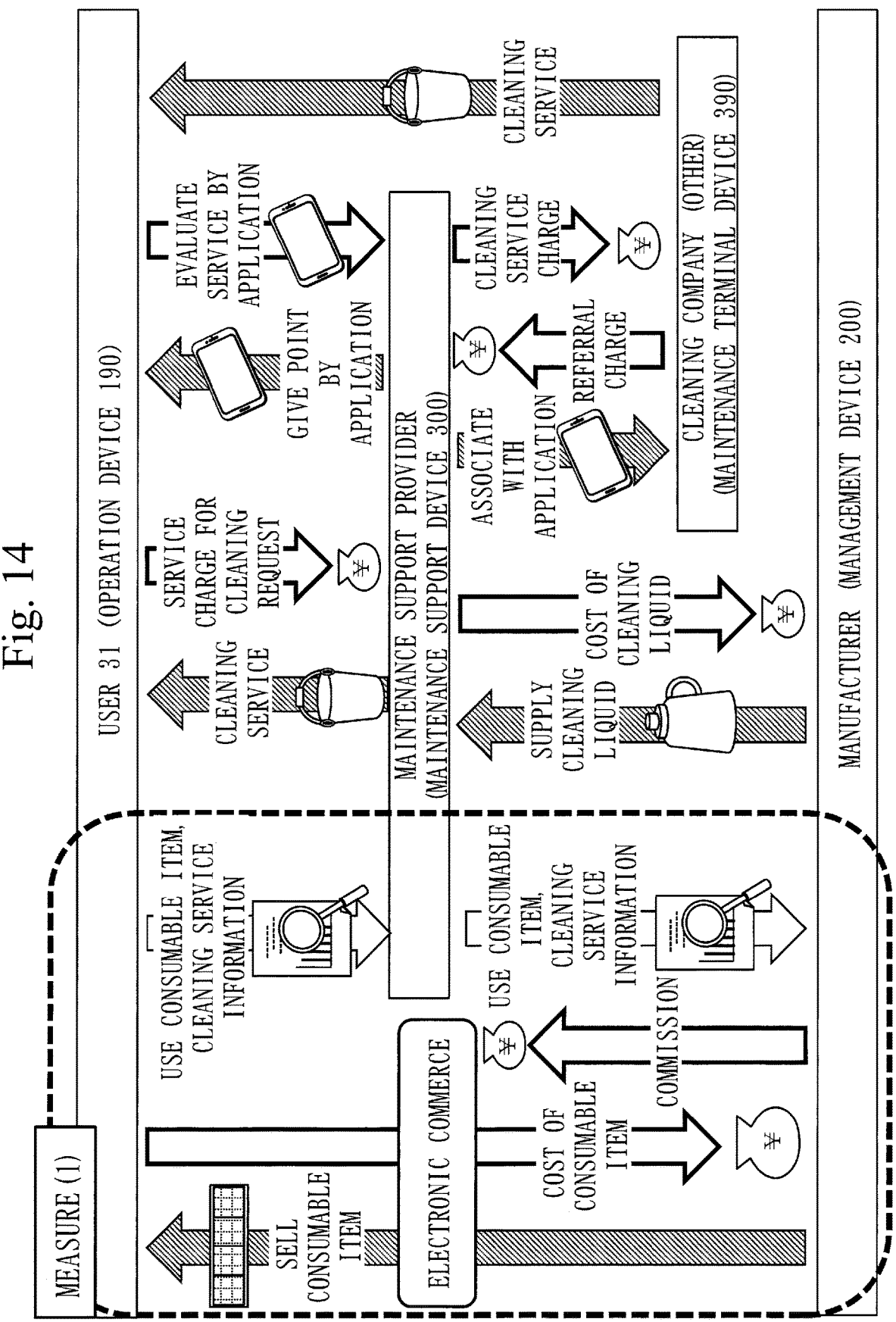
FIG. 14 is a diagram illustrating one of specific examples of an overall configuration of the maintenance management system according to Embodiment 1.

FIG. 14 is a diagram illustrating one of specific examples of an overall configuration of the maintenance management system 500 according to the present embodiment.

In the present embodiment, the function corresponding to the measure (1) has been explained.

The manufacturer sells the consumable item 40 to the user 31 via the electronic commerce. At this time, the management device 200 of the manufacturer suggests based on the lifestyle information 50 relating to the user 31, a type of the consumable item 40 which is the most suitable for the user 31. Further, the manufacturer acquires via the maintenance support device 300 of a maintenance support provider that supports maintenance such as cleaning for the air conditioner 100 or directly acquires from the user 31, the consumable item usage information 51 indicating a usage status of the purchase consumable item 42.

Description of Effects of this Embodiment

Depending on the maintenance management system according to the present embodiment, it is possible to realize a platform for an air conditioner total service that connects an operation device (a user), a management device (a manufacturer), and a maintenance support device (a maintenance support provider) with each other.

Depending on the maintenance management system according to the present embodiment, it is possible to realize to users, direct sales of consumable items for an air conditioner through an operation device as an entry point. Further, depending on the maintenance management system according to the present embodiment, it is possible to suggest the users to purchase the most suitable consumable item and it is possible to improve the quality of the air conditioner total service including maintenance services.

Depending on the maintenance management system according to the present embodiment, an advice instruction can be transmitted to a maintenance terminal device of a maintenance person so that the maintenance person can explain a consumable item in response to the environment of a user, a degree of dirtiness of the consumable item, and a need of the user. Therefore, depending on the maintenance management system according to the present embodiment, it is possible to realize direct sales for consumable items that are reliable and satisfactory for users.

Other Configurations

In the present embodiment, the function of each device in the maintenance management system 500 is implemented by software. As a modified example, the function of each device in the maintenance management system 500 may be implemented by hardware.

Specifically, each device in the maintenance management system 500 is provided with an electronic circuit 909 instead of the processor 910.

Figure 15:
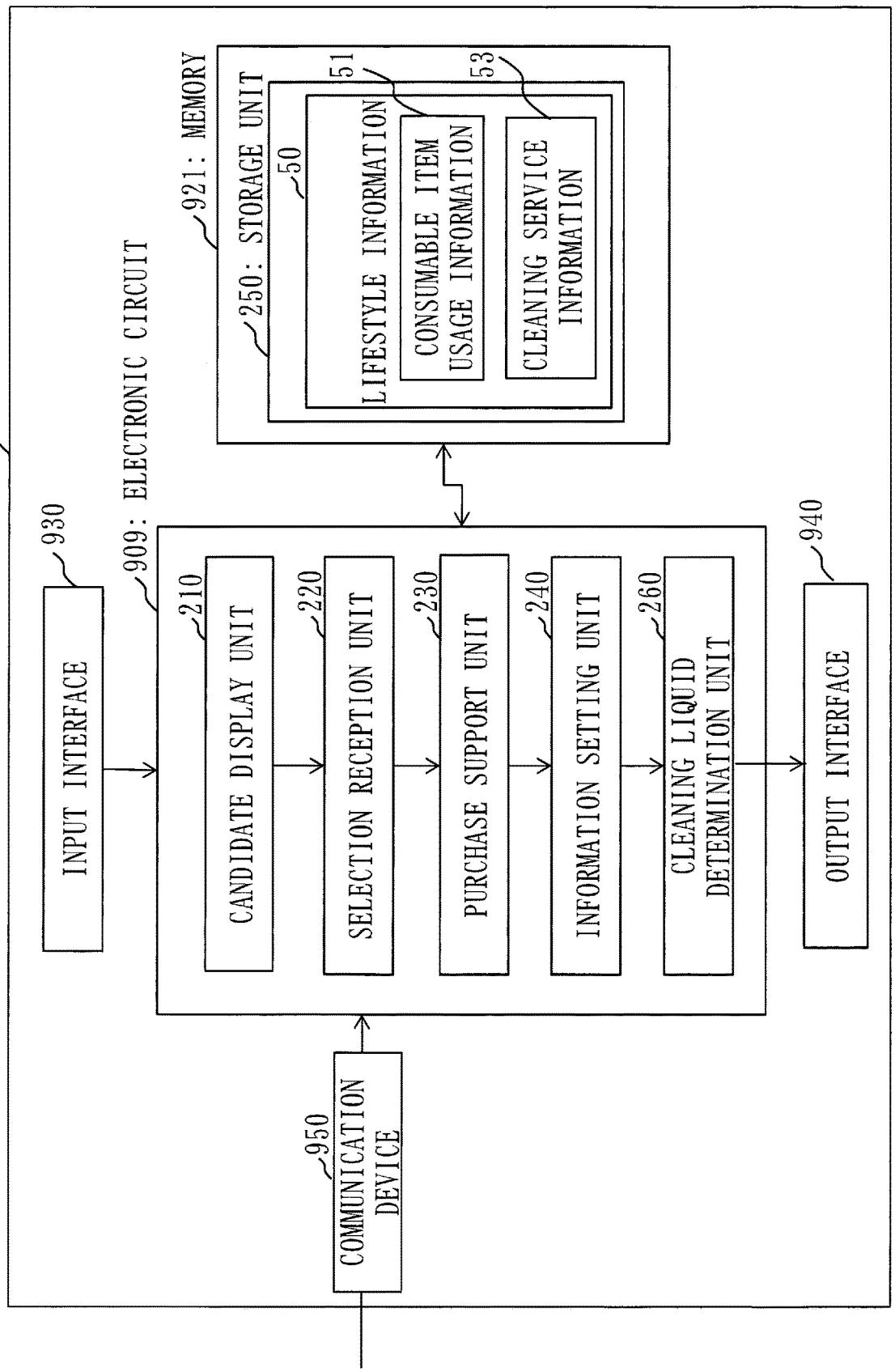
FIG. 15 is a configuration diagram of the management device according to a modified example of Embodiment 1.

FIG. 15 is a diagram illustrating a configuration of the management device 200 according to a modified example of the present embodiment. Here, the modified example of the management device 200 is given as an example. However, each of other devices which are the air conditioner 100, the maintenance support device 300, the operation device 190, and the maintenance terminal device 390 is similarly provided with the electronic circuit 909 instead of the processor 910.

The electronic circuit 909 is a dedicated electronic circuit that implements the function of each device in the maintenance management system 500. The electronic circuit 909 is specifically a single circuit, a composite circuit, a programmed processor, a parallel-programmed processor, a logic IC, a GA, an ASIC, or an FPGA. GA is an abbreviation for Gate Array. ASIC is an abbreviation for Application Specific Integrated Circuit. FPGA is an abbreviation for Field-Programmable Gate Array.

The function of each device in the maintenance management system 500 can be implemented by one electronic circuit or may be implemented by distributing the function over a plurality of electronic circuits.

As another modified example, a part of the function of each device in the maintenance management system 500 may be implemented by the electronic circuit and the rest of the function may be implemented by software.

Alternatively, a part or all of the function of each device in the maintenance management system 500 may be implemented by firmware.

Each of the processor and the electronic circuit is referred to as processing circuitry. That is, the function of each device in the maintenance management system 500 is implemented by the processing circuitry.

Embodiment 2

In the present embodiment, differences from or additions to Embodiment 1 will be mainly described.

In the present embodiment, components that are substantially the same as those in Embodiment 1 are denoted by the same reference signs and description thereof will be omitted.

Description of Configuration

Configurations of the maintenance management system 500 and each device in the maintenance management system 500 according to the present embodiment are the same as those described in Embodiment 1.

In the present embodiment, a case will be described in which the maintenance management system 500 provides a cleaning service for cleaning the air conditioner 100 as maintenance of the air conditioner 100.

Description of Operation

Figure 16:
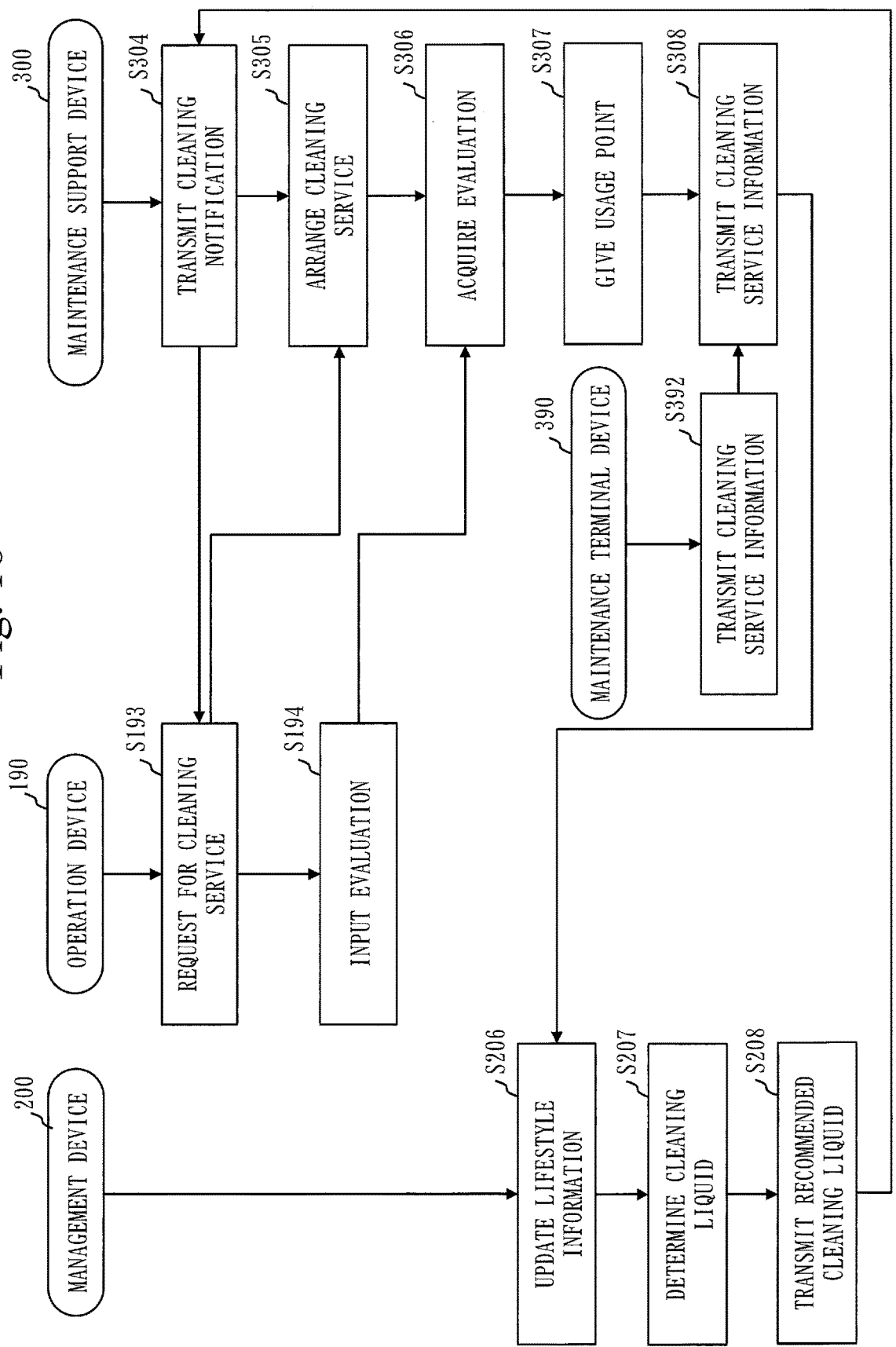
FIG. 16 is a flow diagram showing operation of the maintenance management system according to Embodiment 2.

FIG. 16 is a flow diagram showing operation of the maintenance management system 500 according to the present embodiment.

In step S304, the cleaning determination unit 330 of the maintenance support device 300 determines based on the lifestyle information 50 transmitted by the management device 200, whether or not cleaning for the air conditioner 100 is necessary. For example, the cleaning determination unit 330 determines based on the cleaning service information 53 included in the lifestyle information 50, whether or not the cleaning is necessary. The cleaning determination unit 330 may take other information into account to determine whether or not the cleaning is necessary.

When the cleaning determination unit 330 determines the cleaning is necessary, the cleaning determination unit 330 transmits to the operation device 190, a cleaning notification for notifying the user 31 that the cleaning is necessary. The cleaning determination unit causes the operation device 190 to display the cleaning notification via the maintenance application which is an application program implemented in the operation device 190 or via the maintenance site. In the present embodiment, it is assumed that the maintenance application is used.

FIG. 17 is a diagram illustrating an example of a selection screen for the cleaning company according to the present embodiment.

As illustrated in FIG. 17, the cleaning support unit 340 displays on the operation device 190 via the maintenance application, a list of cleaning companies, each of which provides the cleaning service.

In step S193, the operation device 190 transmits to the maintenance support device 300 via the maintenance application, a cleaning service request indicating a cleaning company selected by the user 31 from the list of the cleaning companies.

The cleaning support unit 340 receives via the maintenance application, the cleaning service request indicating the cleaning company selected by the user 31 from the list of the cleaning companies.

In step S305, the cleaning support unit 340 of the maintenance support device 300 receives the cleaning service request that requests the cleaning service on the air conditioner 100. Based on the cleaning service request, the cleaning support unit 340 executes a process of arranging the cleaning service. Specifically, the cleaning support unit 340 receives the cleaning service request via the maintenance application.

As the process of arranging the cleaning service, the cleaning support unit 340 may automatically transmit a notification to the cleaning company indicated in the cleaning service request. Alternatively, an operator of the maintenance support device 300 may manually proceed the process of arranging the cleaning service.

Figure 18:
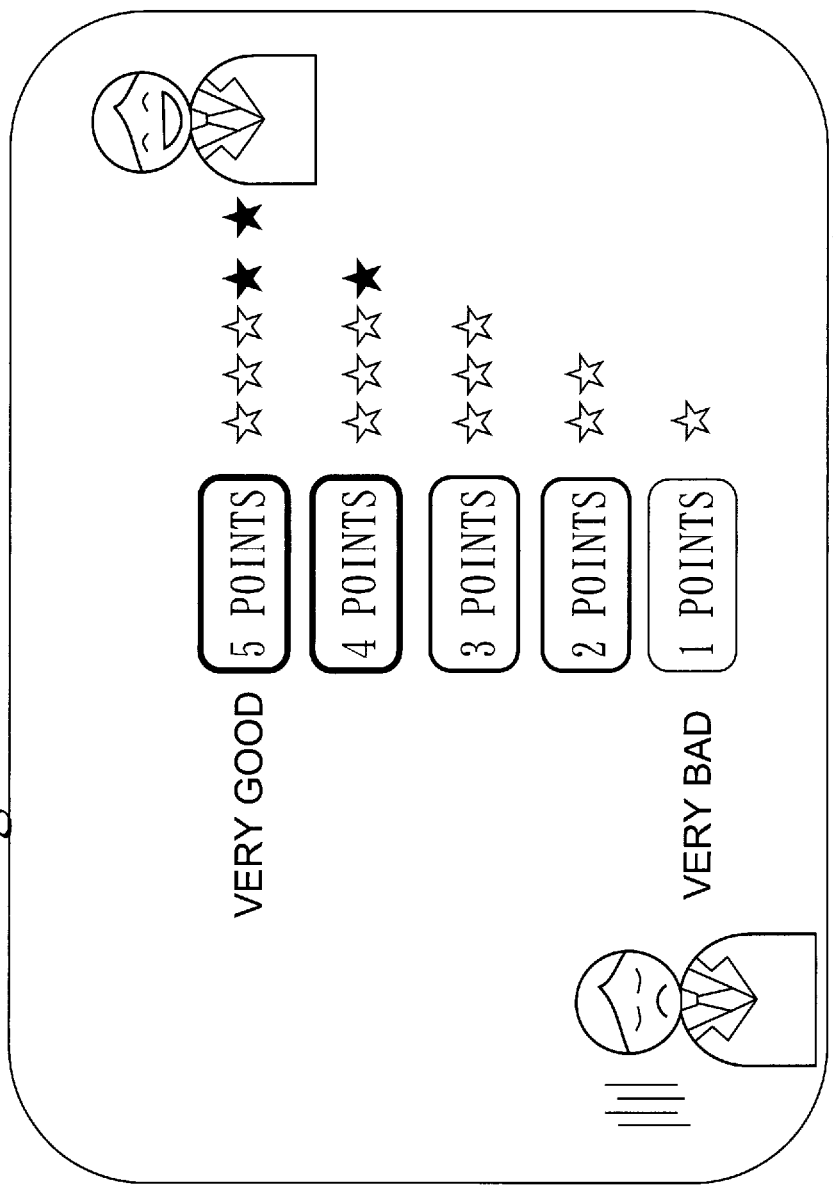
FIG. 18 is a diagram illustrating an example of an input screen for an evaluation point according to Embodiment 2.

FIG. 18 is a diagram illustrating an example of an input screen for an evaluation point according to the present embodiment.

In step S306, after the selected cleaning company has completed providing the cleaning service, the cleaning support unit 340 lets the user 31 input an evaluation for the selected cleaning company via the maintenance application.

In step S194, the operation device 190 receives the evaluation from the user 31 via the maintenance application and transmits an evaluation result to the maintenance support device 300.

Further, in step S307, after providing the cleaning service has been completed, the cleaning support unit 340 may give a usage point to the user 31 via the maintenance application. The user 31 may be able to receive a point service depending on a performance of the usage point.

In step S308, the cleaning support unit 340 transmits to the management device 200 as the cleaning service information 53, the usage status of the cleaning service for the user 31 at a time when providing the cleaning service has been completed.

For example, in step S392, the maintenance person 32 who has performed the cleaning service transmits the cleaning service information 53 from the maintenance terminal device 390 to the maintenance support device 300. Information such as an execution date of the cleaning service, details of cleaning, and a degree of dirtiness is included in the cleaning service information 53.

In step S206, the information setting unit 240 of the management device 200 sets the cleaning service information 53 in the lifestyle information 50. In this way, the information setting unit 240 updates the lifestyle information 50.

In step S207, the cleaning liquid determination unit 260 of the management device 200 determines based on the lifestyle information 50, a type of cleaning liquid used for the cleaning service.

In step S208, the cleaning liquid determination unit 260 transmits a determination result to the maintenance support device 300 as a recommended cleaning liquid 44.

The cleaning determination unit 330 of the maintenance support device 300 transmits to the operation device 190, a cleaning notification indicating the recommended cleaning liquid 44.

Description of Effects of this Embodiment

Figure 19:
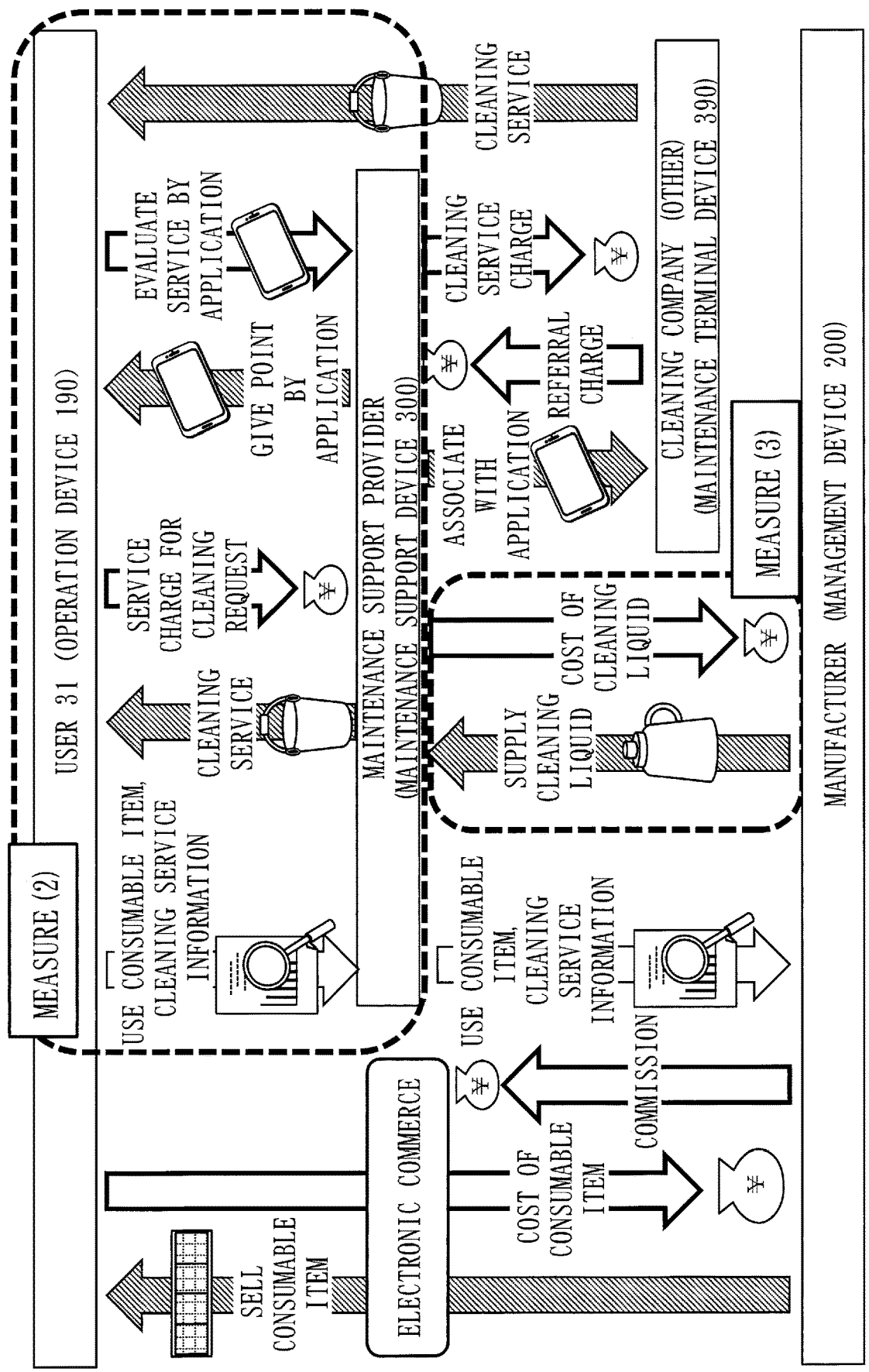
FIG. 19 is a diagram illustrating one of specific examples of the overall configuration of the maintenance management system according to Embodiment 2.

FIG. 19 is a diagram illustrating one of specific examples of the overall configuration of the maintenance management system 500 according to the present embodiment.

In the present embodiment, the functions corresponding to the measure (2) and the measure (3) have been explained.

Depending on the measure (2) of the maintenance management system 500 according to the present embodiment, based on cleaning service information, it is possible to provide a user with an accurate cleaning service that meets the frequency of use of a cleaning service, a usage environment, and a need of the user. Therefore, it is possible to encourage the user to continue an air conditioner comprehensive service.

Depending on the measure (2) of the maintenance management system 500 according to the present embodiment, by strengthening the relationship between a manufacturer and a cleaning company in an air conditioner comprehensive service, it is possible to promote the development of next-generation products aimed at improving the quality of cleaning liquid and improving the efficiency of work.

Figure 20:
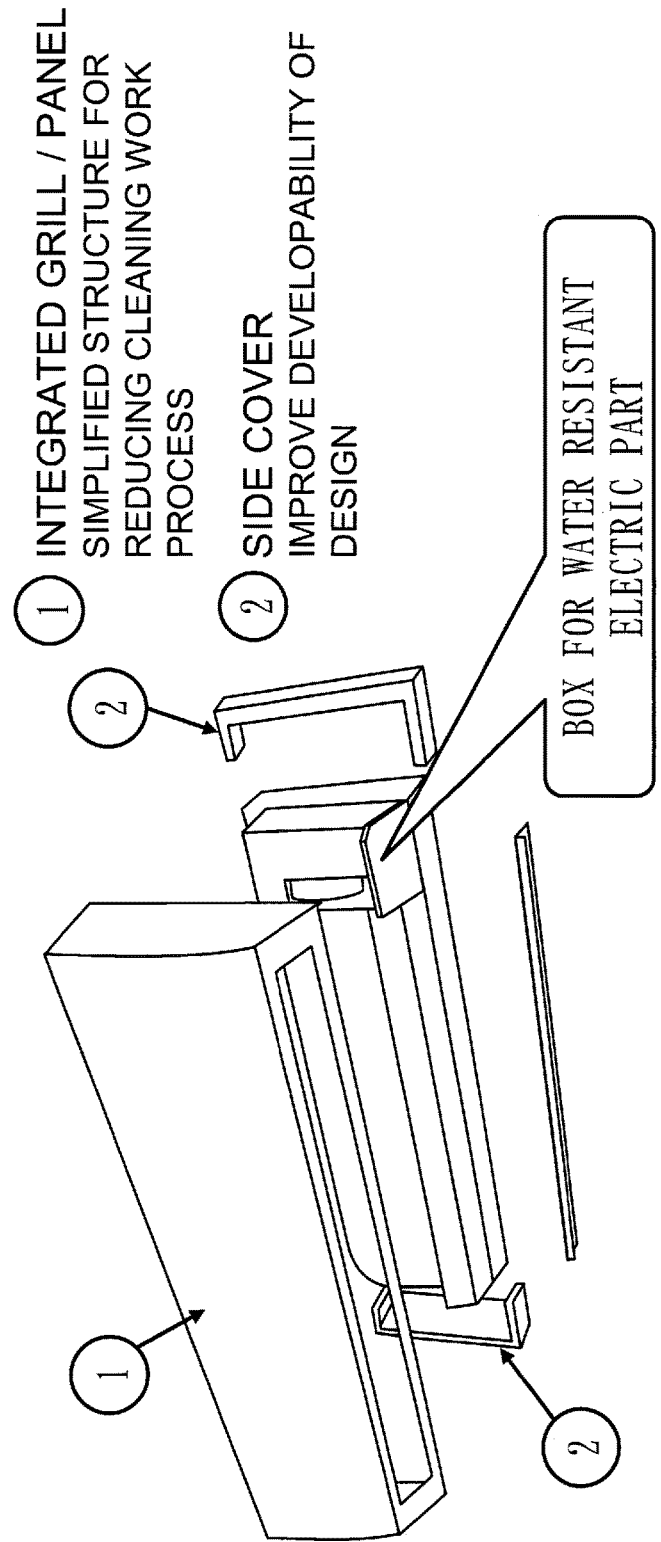
FIG. 20 is a diagram illustrating an example of structural development items for a smooth cleaning work in the maintenance management system according to Embodiment 2.
Figure 21:
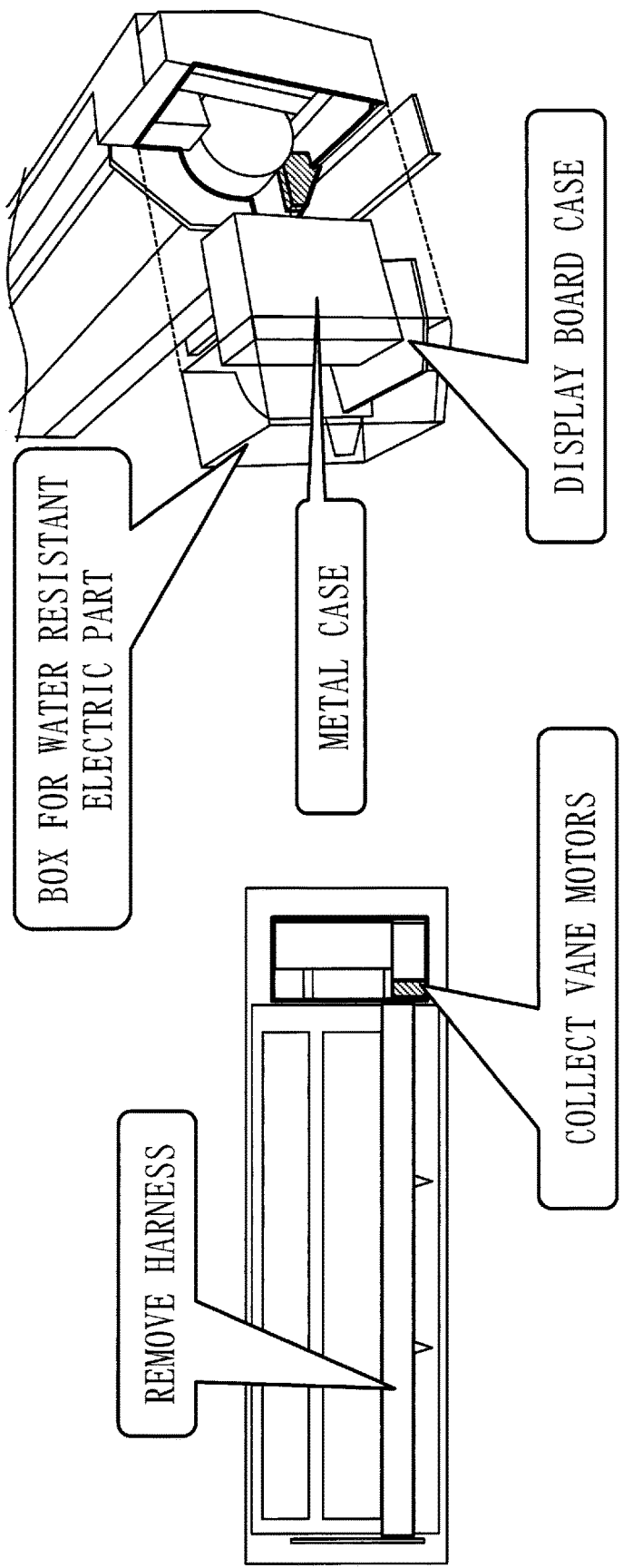
FIG. 21 is a diagram illustrating an example of the structural development items for the smooth cleaning work in the maintenance management system according to Embodiment 2.

Each of FIG. 20 and FIG. 21 is a diagram illustrating an example of structural development items for a smooth cleaning work in the maintenance management system 500 according to the present embodiment.

The structural designs such as (1) new case structure shown in FIGS. 20 and (2) structure of electric component responding to water resistant shown in FIG. 21 enable a maintenance person who performs a cleaning service to smoothly start the cleaning work (especially cleaning a heat exchanger) at a working site. Further, it is possible to reduce a factor of failure during the cleaning service and to provide a cleaning company with confidence.

Further, by strengthening the relationship between a manufacturer and the cleaning company in the air conditioner total service, the maintenance person can advertise the design of product features to the user at the working site at a time of providing the cleaning service and promote to continue the air conditioner total service.

In Embodiments 1 and 2 above, each unit of each device in the maintenance management system 500 has been described as an independent functional block. However, the configuration of each device in the maintenance management system 500 may be different from the configurations described in the above embodiments. The functional block of each device in the maintenance management system 500 may be arranged in any configuration, provided that the functions described in the above embodiments can be realized.

Further, each device in the maintenance management system 500 may be a single device or a system composed of a plurality of devices.

Further, Portions of Embodiments 1 to 2 may be implemented in combination. Alternatively, one portion of these embodiments may be implemented. These embodiments may be implemented as a whole or partially in any combination.

That is, in Embodiments 1 and 2, each embodiment may be freely combined or any constituent element of each embodiment may be modified. Alternatively, in each embodiment, any constituent element may be omitted.

The embodiments described above are essentially preferable examples and are not intended to limit the scope of the present disclosure, the scope of applications of the present disclosure, and the scope of uses of the present disclosure. The embodiments described above can be modified in various ways as necessary.

The invention claimed is:

1. A maintenance management system that comprises:
a management device to manage an air conditioner operated by an operation device; and
a maintenance support device to support maintenance of the air conditioner, and that manages the maintenance of the air conditioner,
the management device storing lifestyle information that shows a lifestyle of a user who uses the air conditioner, the lifestyle information including consumable item usage information, cleaning service information, and personal attribute information of the user,
the maintenance support device comprising first processing circuitry configured
to determine based on the lifestyle information transmitted by the management device, whether or not cleaning for the air conditioner is necessary and to transmit to the operation device when it is determined that the cleaning is necessary, a cleaning notification for notifying that the cleaning is necessary,
to cause the operation device to display, a list of cleaning companies, each of which provides a cleaning service of the air conditioner,
to receive a cleaning service request that requests the cleaning service on the air conditioner and indicates a cleaning company selected from the list of the cleaning companies,
to execute based on the cleaning service request, a process of arranging the cleaning service, and
to cause the operation device to allow input of an evaluation for the selected cleaning company after the selected cleaning company has completed providing the cleaning service,
the management support device comprising second processing circuitry configured
to determine based on the lifestyle information, a type of cleaning liquid used for the cleaning service, and
to transmit a determination result to the maintenance support device as a recommended cleaning liquid, and
the first processing circuitry being further configured to transmit to the operation device, the cleaning notification indicating the recommended cleaning liquid.

2. The maintenance management system according to claim 1, wherein
the management device comprises second processing circuitry configured
to select based on the lifestyle information, a type to be presented from among a plurality of types of a consumable item used in the air conditioner, and to cause the operation device to display the selected type as purchase candidates;
to receive a candidate selected from among the purchase candidates, as a purchase consumable item; and
to cause the operation device to allow purchase of the purchase consumable item through an electronic commerce environment.

3. The maintenance management system according to claim 2, wherein
the second processing circuitry is further configured to
acquire an advice instruction for narrowing down the purchase candidates and
cause the operation device to display the purchase candidates narrowed down by following the advice instruction.

4. The maintenance management system according to claim 3, wherein
the first processing circuitry is further configured
to transmit to the operation device, the advice instruction input via a maintenance terminal device used in operating the maintenance of the air conditioner and
to acquire the advice instruction transmitted.

5. The maintenance management system according to claim 2, wherein
the consumable item is a filter used in the air conditioner and
a plurality of types of the filter includes a dust collection filter, a deodorization filter, and an allergen removal filter.

6. The maintenance management system according to claim 2, wherein
the first processing circuitry is further configured to
acquire consumable item usage information that shows a usage status of the air conditioner at a time when the purchase consumable item is used in the air conditioner,
transmit the consumable item usage information to the management device, and
cause the management device to set the consumable item usage information in the lifestyle information.

7. The maintenance management system according to claim 1, wherein
the first processing circuitry is further configured to
cause the operation device to display the cleaning notification via a maintenance application which is an application program implemented in the operation device, and
receive the cleaning service request via the maintenance application.

8. The maintenance management system according to claim 7, wherein
the first processing circuitry is further configured to
cause the operation device to display via the maintenance application, the list of the cleaning companies, and
cause the operation device to allow the input of the evaluation for the selected cleaning company via the maintenance application after the selected cleaning company has completed providing the cleaning service.

9. The maintenance management system according to claim 8, wherein
the first processing circuitry is further configured to give a usage point via the maintenance application after providing the cleaning service has been completed.

10. The maintenance management system according to claim 8, wherein
the first processing circuitry is further configured to transmit to the management device as cleaning service information, a usage status of the cleaning service for at a time when providing the cleaning service has been completed.

11. A maintenance management method by a maintenance management system that comprises:
a management device to manage an air conditioner operated by an operation device; and
a maintenance support device to support maintenance of the air conditioner, and that manages the maintenance of the air conditioner, the maintenance management method comprising:
determining based on lifestyle information that shows a lifestyle of a user who uses the air conditioner, the lifestyle information including consumable item usage information, cleaning service information, and personal attribute information of the user, and being transmitted by the management device, whether or not cleaning for the air conditioner is necessary and transmitting to the operation device when it is determined that the cleaning is necessary, a cleaning notification for notifying that the cleaning is necessary;
displaying on the operation device, a list of cleaning companies, each of which provides a cleaning service on the air conditioner;
receiving a cleaning service request that requests the cleaning service on the air conditioner and indicates a cleaning company selected from the list of the cleaning companies displayed on the operation device,
executing based on the cleaning service request, a process of arranging the cleaning service,
receiving an evaluation for the selected cleaning company, the evaluation being input after the selected cleaning company has completed providing the cleaning service,
determining based on the lifestyle information, a type of cleaning liquid used for the cleaning service,
transmitting a determination result to the maintenance support device as a recommended cleaning liquid, and
transmitting to the operation device, the cleaning notification indicating the recommended cleaning liquid.

12. A non-transitory computer readable medium storing a maintenance management program for a maintenance management system that comprises:
a management device to manage an air conditioner operated by an operation device; and
a maintenance support device to support maintenance of the air conditioner, and that manages the maintenance of the air conditioner, the maintenance management program causing at least one computer to execute:
a candidate display process to determine based on lifestyle information that shows a lifestyle of a user who uses the air conditioner, the lifestyle information including consumable item usage information, cleaning service information, and personal attribute information of the user, and being transmitted by the management device, whether or not cleaning for the air conditioner is necessary and to transmit to the operation device when it is determined that the cleaning is necessary, a cleaning notification for notifying that the cleaning is necessary; and
a cleaning support process
to display on the operation device, a list of cleaning companies, each of which provides a cleaning service on the air conditioner,
to receive a cleaning service request that requests the cleaning service on the air conditioner and indicates a cleaning company selected from the list of the cleaning companies displayed on the operation device,
to execute based on the cleaning service request, a process of arranging the cleaning service, and
to receive an evaluation for the selected cleaning company, the evaluation being input after the selected cleaning company has completed providing the cleaning service, to determine based on the lifestyle information, a type of cleaning liquid used for the cleaning service,
to transmit a determination result to the maintenance support device as a recommended cleaning liquid, and
to transmit to the operation device, the cleaning notification indicating the recommended cleaning liquid.

* * * * *